(12) United States Patent
de Azevedo et al.

(10) Patent No.: US 10,264,425 B2
(45) Date of Patent: Apr. 16, 2019

(54) SYSTEMS AND METHODS FOR SELF-INITIALIZATION AND AUTOMATED BOOTSTRAPPING OF MOBILE ACCESS POINTS IN A NETWORK OF MOVING THINGS

(71) Applicant: Veniam, Inc., Mountain View, CA (US)

(72) Inventors: Joao Pedro Coelho de Azevedo, Porto (PT); Diogo Emanuel da Silva Jordao Carreira, Pombal (PT)

(73) Assignee: Veniam, Inc., Mountain View, CA (US)

( * ) Notice: Subject to any disclaimer, the term of this patent is extended or adjusted under 35 U.S.C. 154(b) by 0 days.

(21) Appl. No.: 15/203,714

(22) Filed: Jul. 6, 2016

(65) Prior Publication Data

US 2017/0215021 A1    Jul. 27, 2017

Related U.S. Application Data

(60) Provisional application No. 62/286,515, filed on Jan. 25, 2016.

(51) Int. Cl.
| | |
|---|---|
| *H04W 4/50* | (2018.01) |
| *H04L 12/24* | (2006.01) |
| *H04L 12/26* | (2006.01) |
| *H04L 29/08* | (2006.01) |

(Continued)

(52) U.S. Cl.
CPC ............. *H04W 4/50* (2018.02); *H04L 43/50* (2013.01); *H04W 24/10* (2013.01); *H04L 41/0853* (2013.01); *H04L 67/12* (2013.01); *H04W 84/005* (2013.01)

(58) Field of Classification Search
CPC ....... H04W 4/02; H04W 24/00; H04W 24/06; H04W 88/08; H04W 88/02; H04W 88/04; H04L 12/2697; H04M 1/6075; H04B 7/15507; H04B 17/0085; H04B 17/29

See application file for complete search history.

(56) References Cited

U.S. PATENT DOCUMENTS

| | | | |
|---|---|---|---|
| 2004/0073654 A1* | 4/2004 | Sarma | G06F 11/2294 |
| | | | 709/224 |
| 2006/0194553 A1* | 8/2006 | Ozaki | G01R 29/10 |
| | | | 455/226.1 |

(Continued)

*Primary Examiner* — George Eng
*Assistant Examiner* — Umair Ahsan
(74) *Attorney, Agent, or Firm* — McAndrews, Held & Malloy, Ltd.

(57) ABSTRACT

Systems and methods for self-initialization and automated bootstrapping of mobile access points in a network of moving things. A software application directs an automated system for the pre-initialization and provisioning of various elements of a network of moving things by gathering information about network element hardware components, accesses and installs on the network element the appropriate software components, a performs testing of the provisioned network element. Information identifying the hardware, software, and results of testing of the provisioned network element are made available on a cloud-based repository. This enables network personnel and management, and suppliers of the network elements components to track and manage provisioning, performance, and trouble information.

27 Claims, 20 Drawing Sheets

(51) Int. Cl.
*H04W 24/10* (2009.01)
*H04W 84/00* (2009.01)

(56) References Cited

U.S. PATENT DOCUMENTS

| | | | | |
|---|---|---|---|---|
| 2007/0220392 | A1* | 9/2007 | Bhaumik | H04L 12/2697 714/742 |
| 2011/0257923 | A1* | 10/2011 | Boulton | G01S 5/0221 702/117 |
| 2013/0049786 | A1* | 2/2013 | El-Hassan | H04B 17/0085 324/756.01 |
| 2015/0109941 | A1* | 4/2015 | Zhang | H04B 17/0085 370/252 |
| 2015/0264590 | A1* | 9/2015 | Michl | H04B 17/0085 455/67.14 |
| 2015/0339628 | A1* | 11/2015 | Oh | H04W 52/0258 715/736 |
| 2017/0063474 | A1* | 3/2017 | Humphrey | G06F 17/30312 |
| 2017/0085632 | A1* | 3/2017 | Cardote | H04W 4/046 |
| 2017/0094540 | A1* | 3/2017 | Lutz | H04W 24/08 |

* cited by examiner

| Test | Expected results | What happen if an error occurs? |
|---|---|---|
| System Hash | Last Software Running | NR must be programed again (problem could be on the programming method or in the build image) |
| System Resources | x% of free Disk Space; Available Devices (DSRC, Wi-Fi, Storage) | NR must be programed again (problem could be on the programming method or in the build image); Some physical device could be broken and may needs replacement |
| Accelerometer | Vibration Detection & Acknowledgement | Problem could be on the physical accelerometer or Firmware related |
| GPS module | GPS Fix | Problem could be in the GPS module/antenna or Firmware related |
| DSRC & LTE | (1) Reach the API through DSRC; (2) Reach the API Cell through LTE | (1) The problem could be on the NR network manager or in the DSRC antennas; (2) The problem could be on the USB dongle/SIM card |
| Wi-Fi Service | To access the Wi-Fi service, the captive portal must appear; After that, the user must be able to normally surf on the web | The problem could be software related or in the Wi-Fi antenna |

Figure 15

Table 1600 (Figure 16):

| node_id | board_supplier | board_model | board_serial | board_mac_addr | lp_supplier | lp_model | lp_mac_addr | wifi_supplier |
|---|---|---|---|---|---|---|---|---|
| 0 | supplier1 | abc | 00000 | 00:00:00:00:00:00 | supplier2 | def | 00:00:00:00:00:00 | supplier2 |

| wifi_model | wifi_serial | wifi_mac_addr | bt_supplier | bt_model | bt_serial | last_modified |
|---|---|---|---|---|---|---|
| ghi | 00000000 | 00:00:00:00:00:00 | supplier3 | jkl | 00000 | 2016-01-07 11:40:33 |

Figure 16

Table 1700 (Figure 17):

| mac_addr | node_id | test_setup | tests_passed | tests_description | last_test | author |
|---|---|---|---|---|---|---|
| 00:00:00:00:00:00 | 0 | 2015-07-09 13:18:28 | 100 | All tests passed | 2015-07-09 13:19:25 | workstation0 |

Figure 17

SYSTEMS AND METHODS FOR SELF-INITIALIZATION AND AUTOMATED BOOTSTRAPPING OF MOBILE ACCESS POINTS IN A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Patent Application Ser. No. 62/286,515, filed on Jan. 25, 2016, and titled "Systems and Methods for Self-Initialization and Automated Bootstrapping of Mobile Access Points in a Network of Moving Things," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/222,192, titled "Communication Network of Moving Things," filed on Sep. 22, 2015; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," filed on Jan. 14, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Current communication networks are unable to adequately support communication environments involving moving networks. As a non-limiting example, current communication networks are unable to adequately support a network comprising a complex array of both moving and static nodes, some of which may be network access points (e.g., the Internet of moving things) interacting with sensor systems. Limitations and disadvantages of conventional methods and systems will become apparent to one of skill in the art, through comparison of such approaches with some aspects of the present methods and systems set forth in the remainder of this disclosure with reference to the drawings.

BRIEF DESCRIPTION OF SEVERAL VIEWS OF THE DRAWINGS

FIG. 15 is a table illustrating examples of types of tests that may be performed upon a network element during a process of preparing the network element for deployment in a network of moving things, in accordance with various aspects of the present disclosure.

FIG. 16 illustrates an example network element assembly report, in accordance with various aspects of the present disclosure.

FIG. 17 illustrates an example network element setup and test report, in accordance with various aspects of the present disclosure.

SUMMARY

Figure 1:
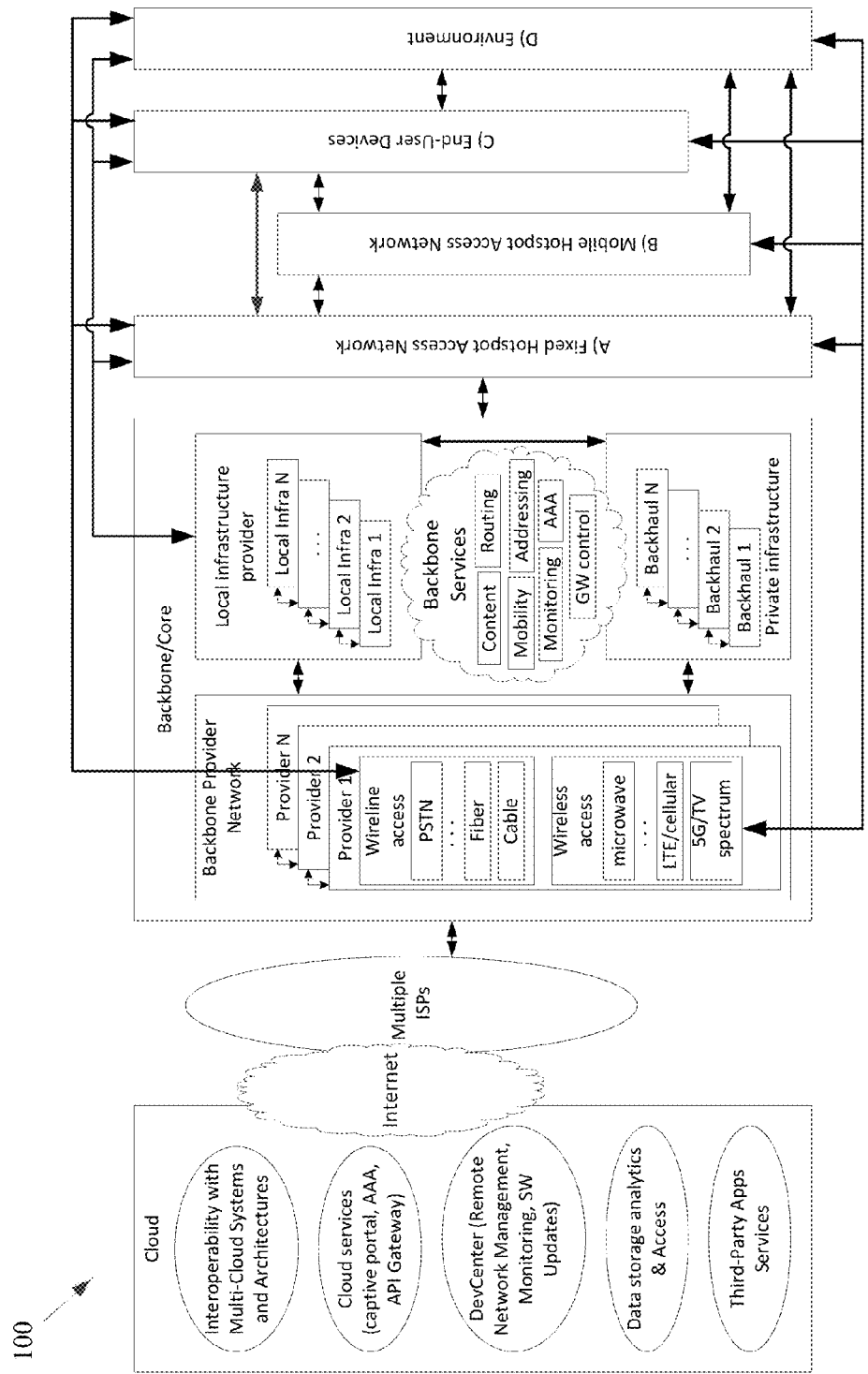
FIG. 1 shows a block diagram of a communication network, in accordance with various aspects of this disclosure.

Various aspects of this disclosure provide systems and methods for enhancing operation of entities in a network of moving things. As non-limiting examples, various aspects of this disclosure provide systems and methods for self-initialization and automated bootstrapping of network elements such as mobile access points in a network of moving things.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner. The present disclosure also provides various aspects of systems and method for self-initialization an automated bootstrapping of network elements of such a network of moving things.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, etc.) as Wi-Fi hotspots. Note that Wi-Fi is generally used throughout this discussion as an example, but the scope of various aspects of this disclosure is not limited thereto. For example, other wireless Local Area Network (LAN) technologies, Personal Area Network (PAN) technologies, Metropolitan Area Network (MAN) technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for Subscriber Identity Module (SIM) cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and CO2 emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, NO2, O3, volatile organic compounds (or VOCs), CO2, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles. Such sensors may, for example, comprise positioning sensors (e.g., GPS sensors, Galileo sensors, GLONASS sensors, etc.). Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also be (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, trucks' positions and engines' status, and then be able to provide real-time notifications to drivers (e.g., to turn on/off the engine, follow the right route inside the harbor, take a break, etc.), thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/

Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
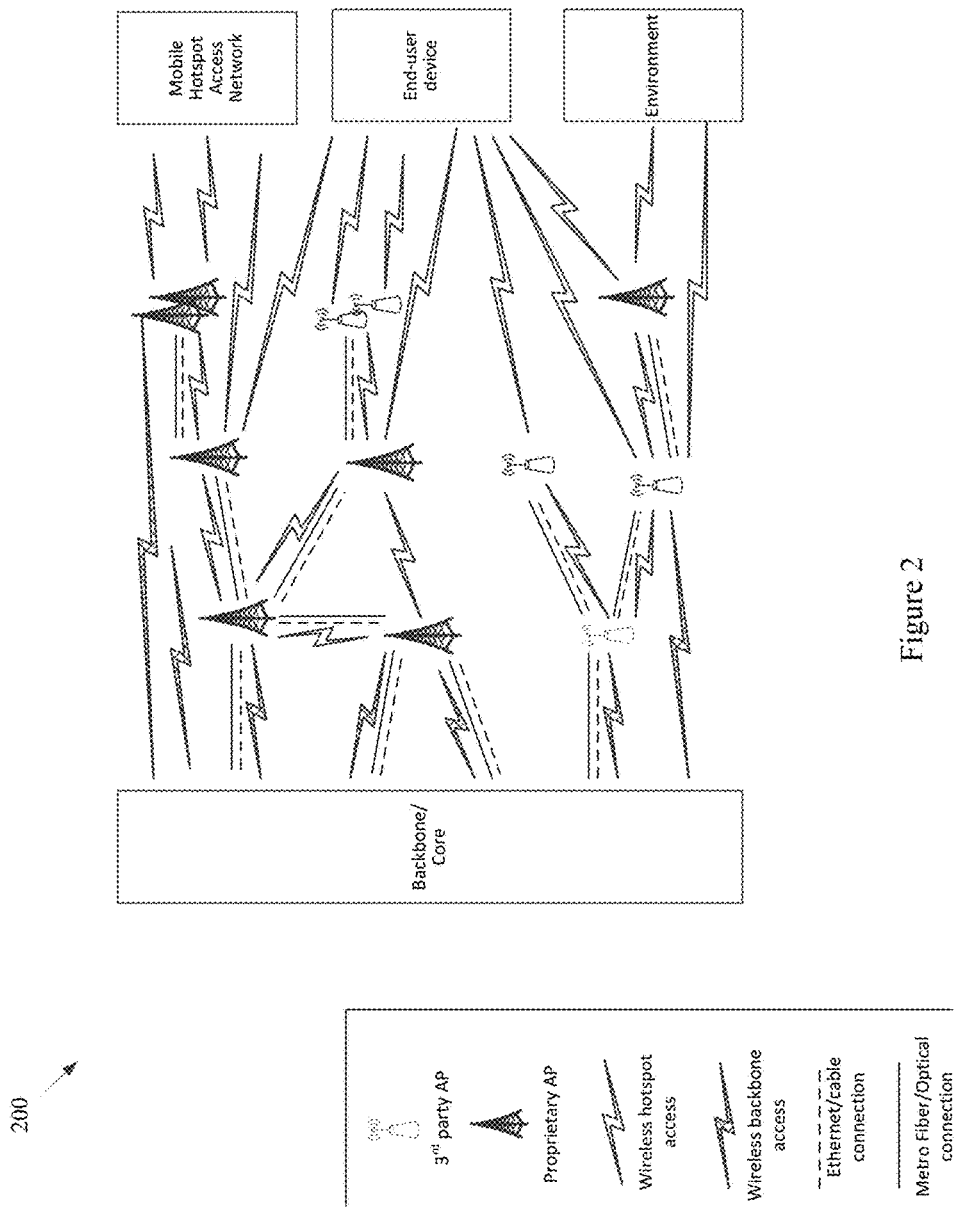
FIG. 2 shows various example characteristics of a Fixed Hotspot Access Network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, and 600, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
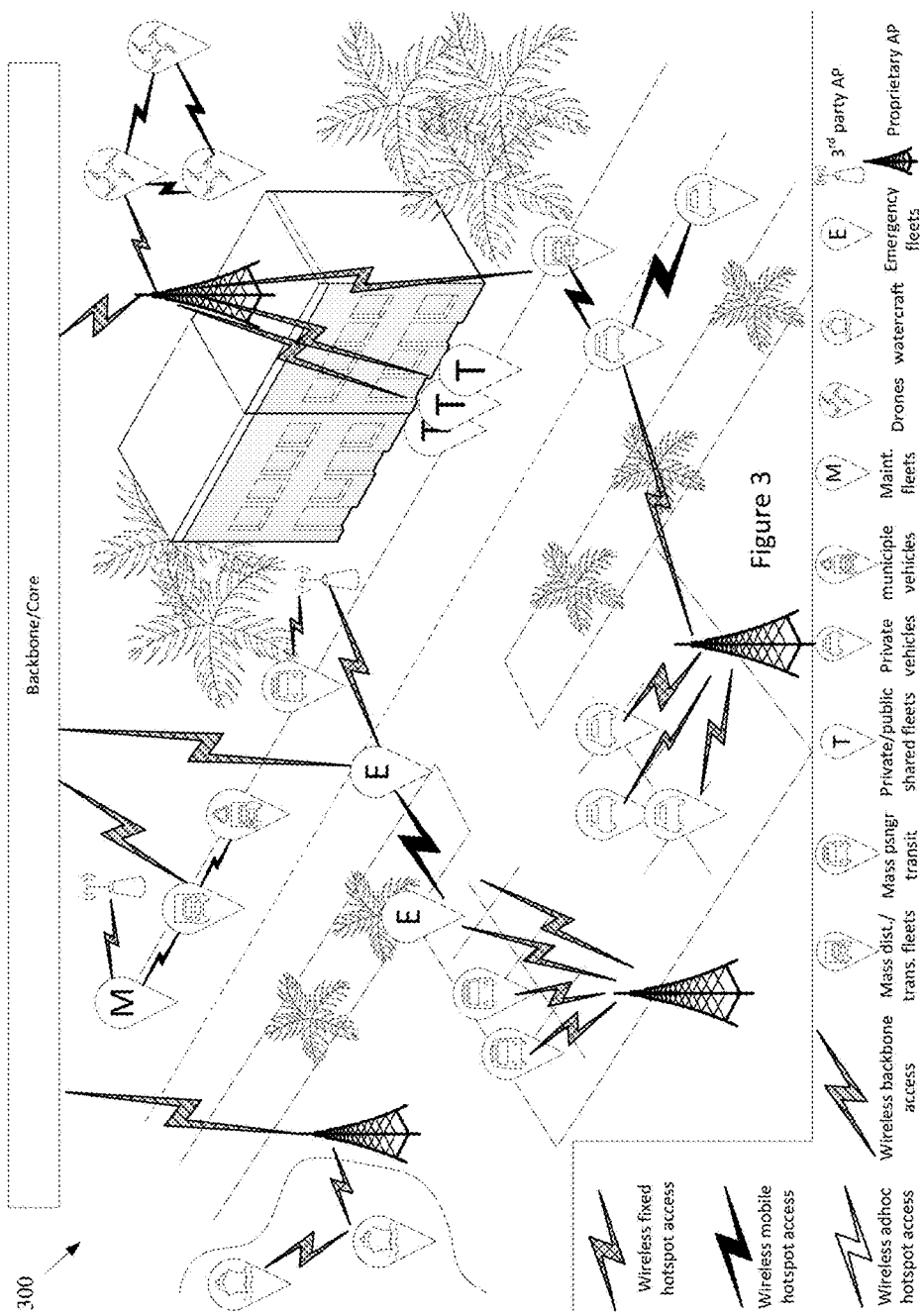
FIG. 3 shows various example characteristics of a Mobile Hotspot Access Network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, and 600 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
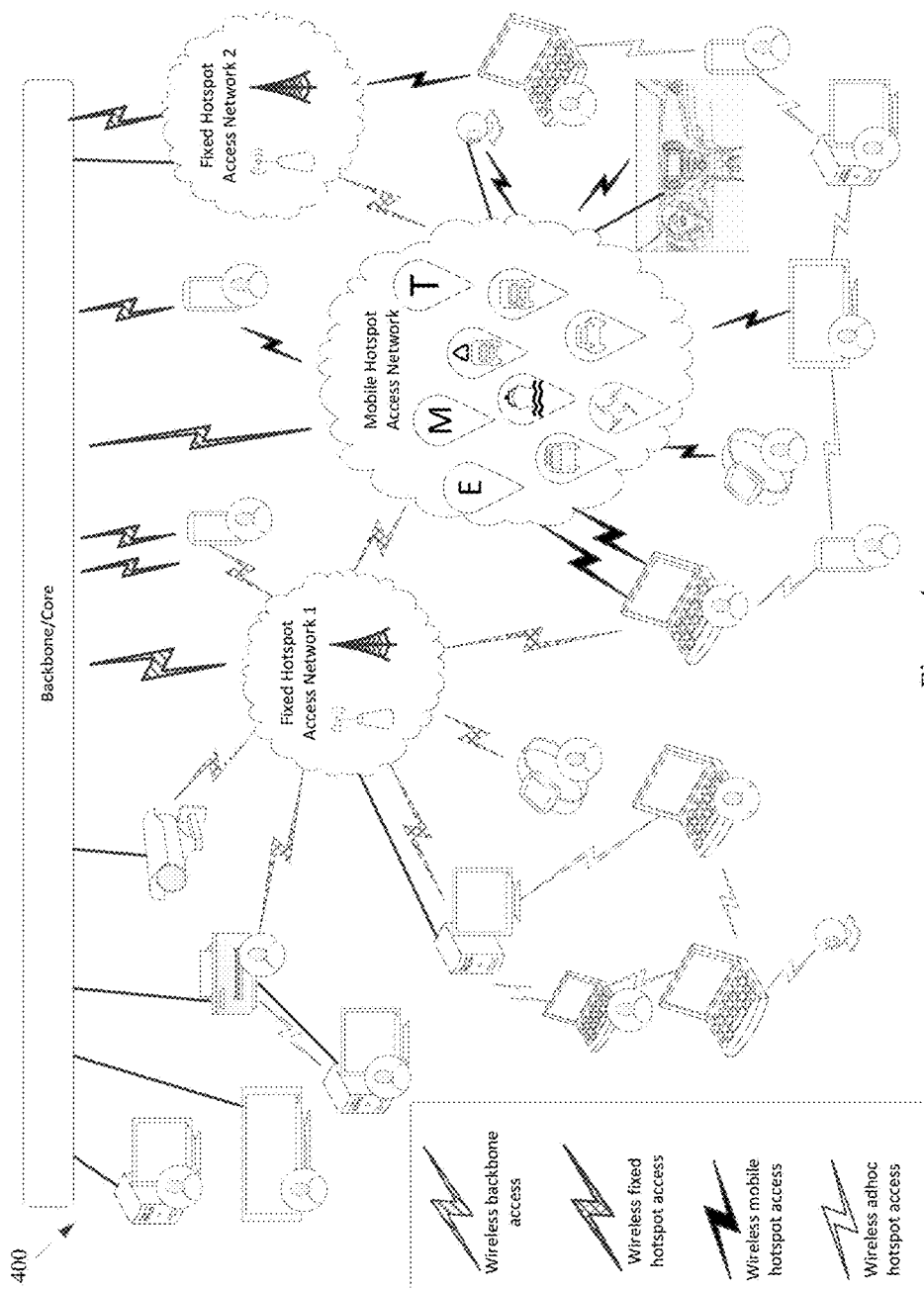
FIG. 4 shows various example end user devices, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
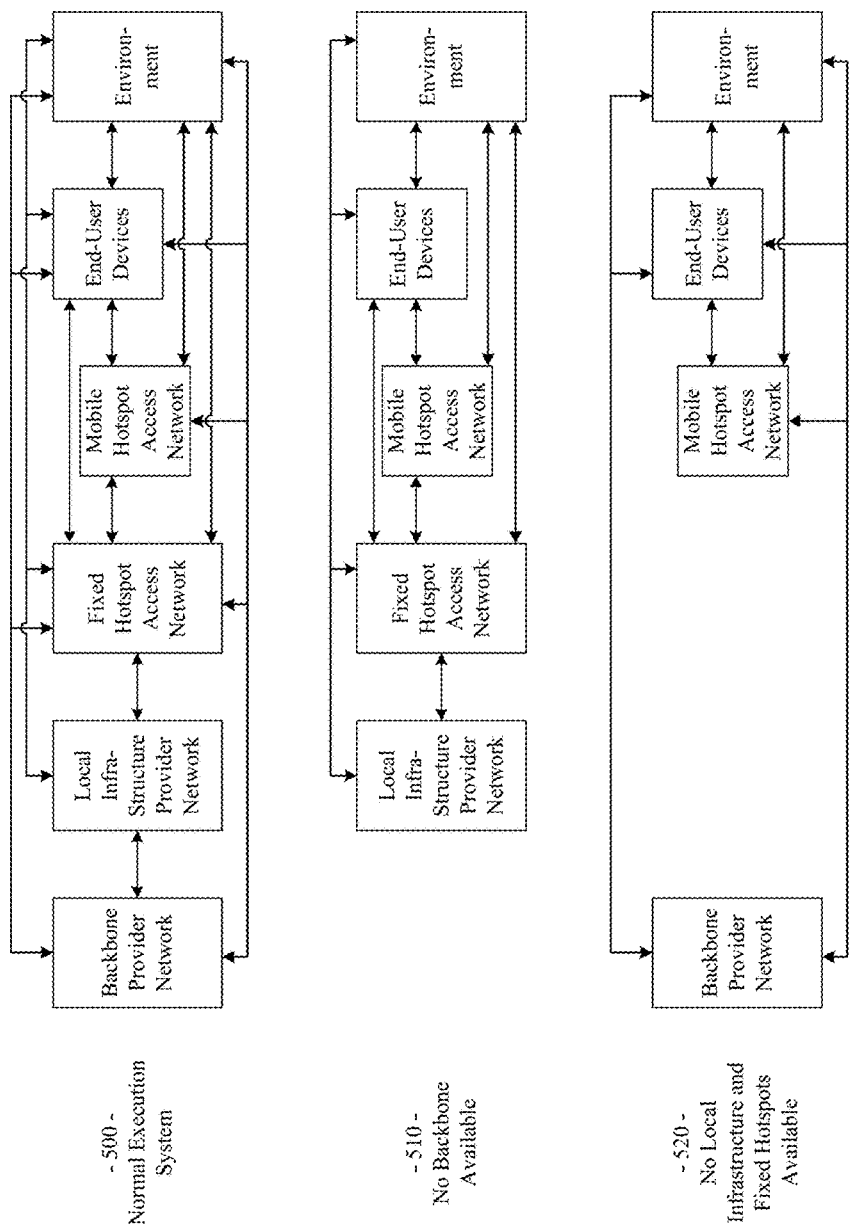
FIGS. 5A-5C illustrate network flexibility by providing example modes (or configurations), in accordance with various aspects of this disclosure.
Figure 5B:
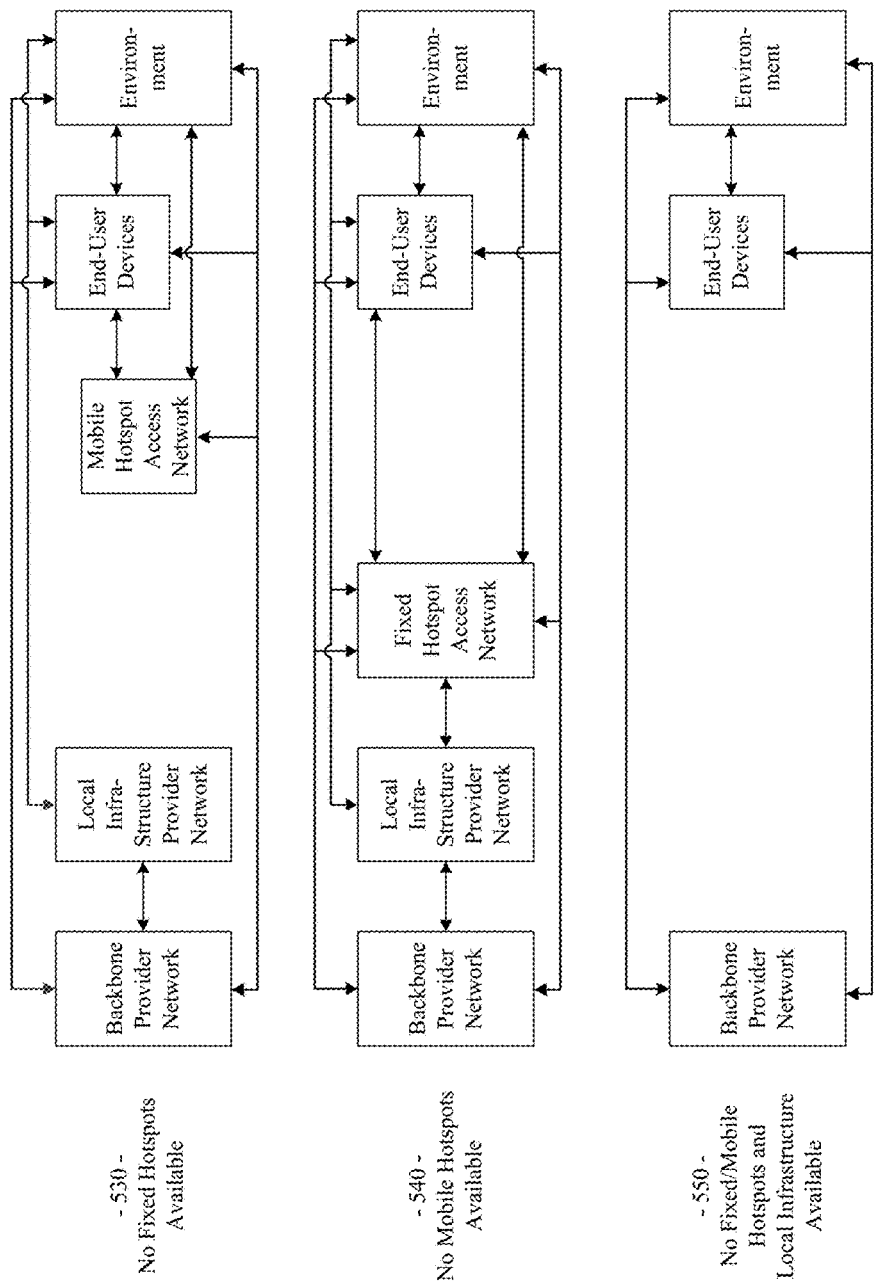
Figure 5C:
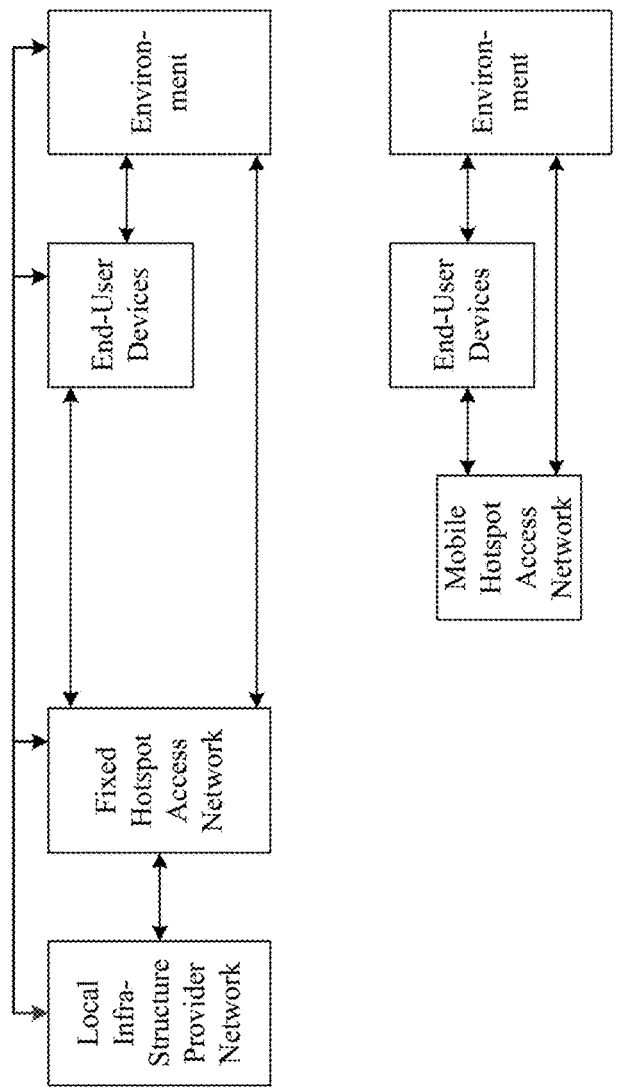

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
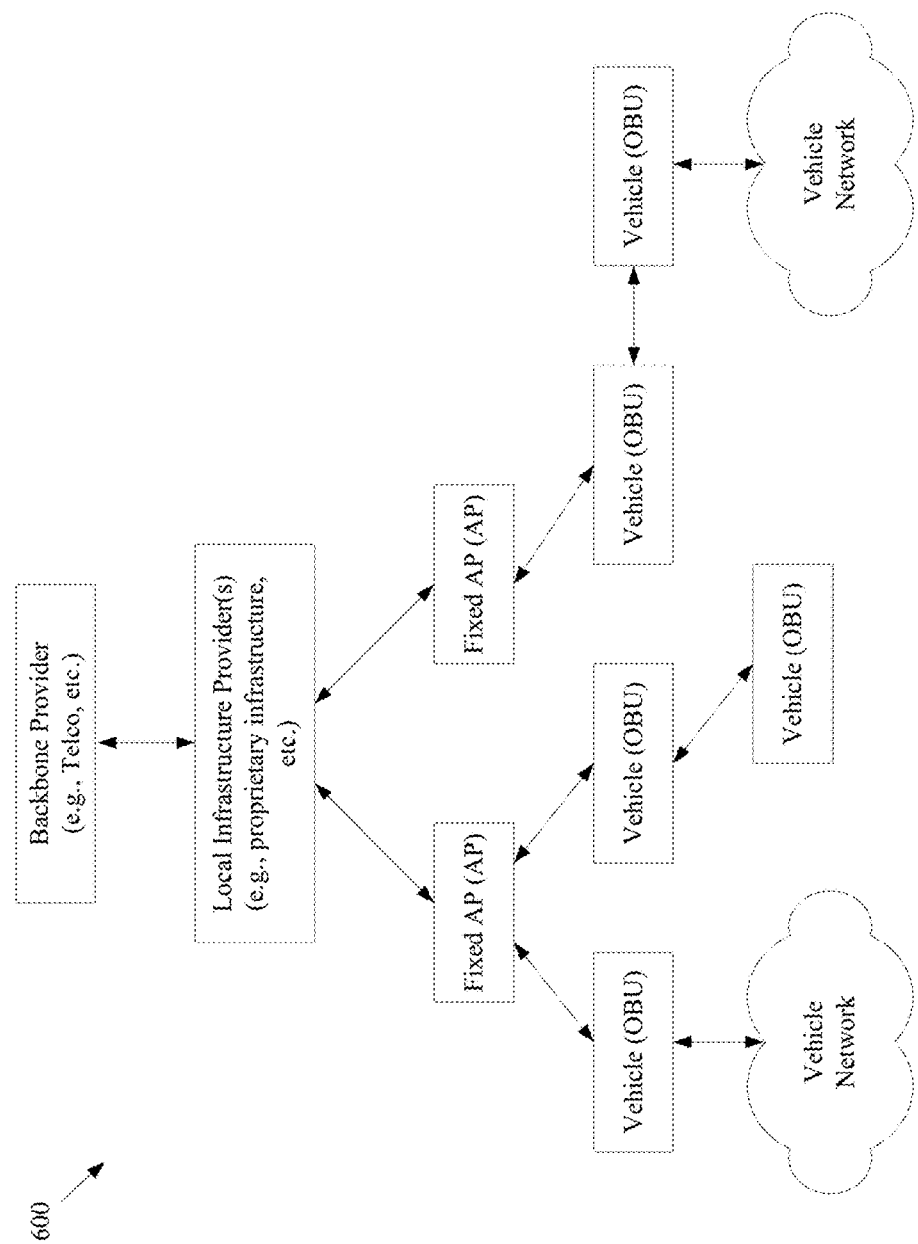
FIG. 6 shows yet another block diagram of an example network configuration, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

As discussed herein, a network of moving things (e.g., including moving access points, moving sensors, moving user client devices, etc.) may be supported by an infrastructure that comprises a mesh among fixed and mobile APs that can flexibly establish connections with the Internet, the Cloud, private networks, etc.

The functionality of the various fixed and mobile elements of a network of moving things may include software or firmware that is executable by processors, and may include data used by such processors that, for example, control the establishment and management of communication over the various wired and wireless links, communicate data between various elements, enable configuration of various elements according to the use of the network portions, provide services to end users, and perform diagnostics and maintenance of network elements. The software, firmware, and data of the various fixed and mobile elements of a network of moving things may, for example, be in the form of programs, modules, functions, and/or subroutines made of any combination of one or more of machine executable instructions, intermediate language instructions, interpreted pseudocode instructions, and/or higher level or script language instructions. In accordance with the present disclosure, a network of moving things may provide functionality that enables the network to continue to evolve after network deployment, enabling the distribution of updated software, firmware, and/or data that provides new features and enhancements in a curable and reliable manner. In accordance with the present disclosure, such update information for updating software, firmware, and/or data may be referred herein to simply as a software update, an "update," or "update file," and may include digital information representing a configuration of a network entity, software, firmware, and/or the arrangement of the network entities with respect to one another. Such updates may be created to update the software, firmware, and/or data at any granularity including, by way of example and not limitation, at one or more of the program, module, function, and/or subroutine levels. Such updates may be agnostic of the location and expected behavior, and may be totally adaptable to any constraints and requirements desired by the system operator or users.

Figure 7:
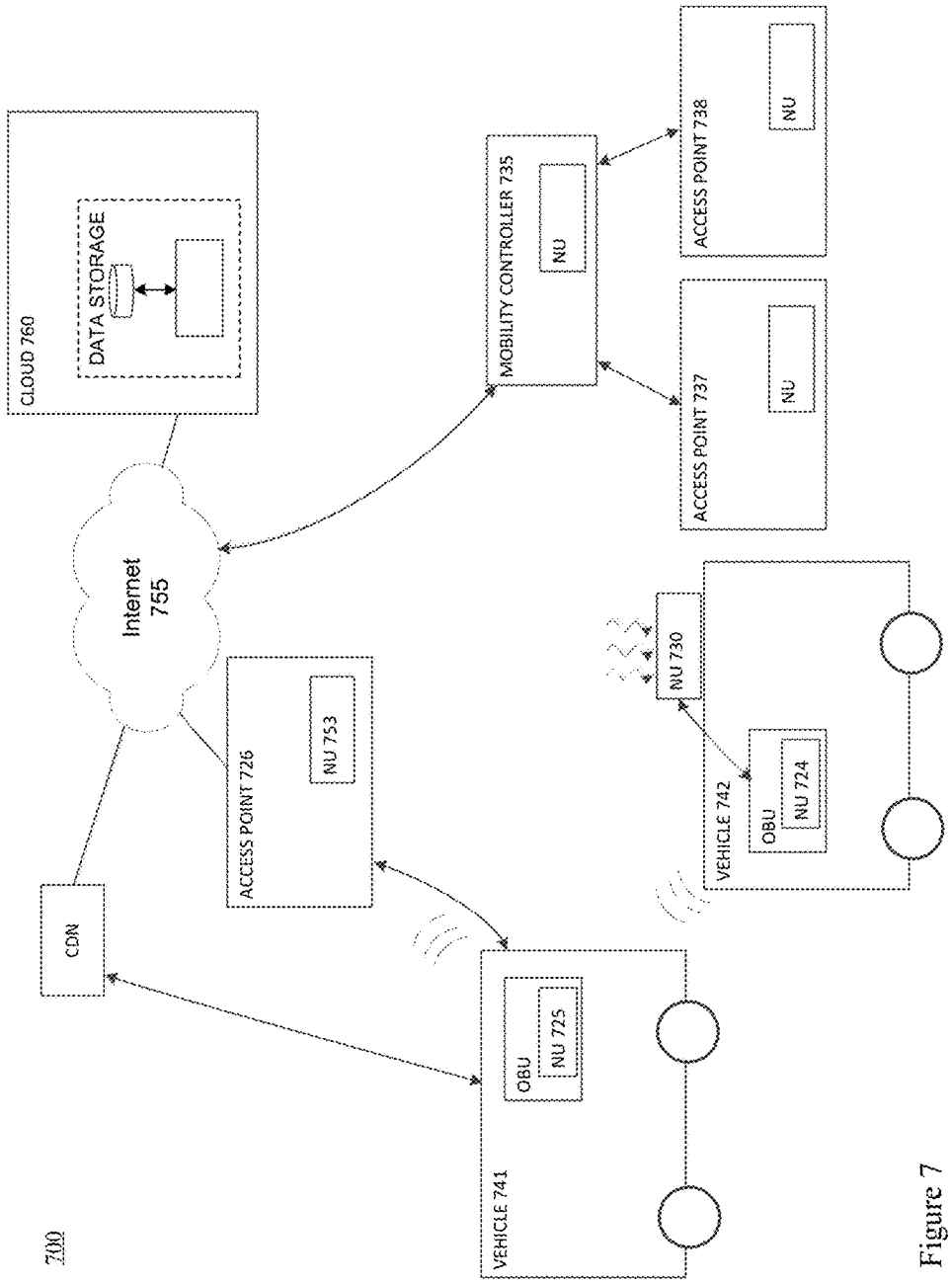
FIG. 7 shows a block diagram of an example communication network, in accordance with various aspects of the present disclosure.

FIG. 7 shows a block diagram of an example communication network 700, in accordance with various aspects of the present disclosure. The example network 700 may, for example, share any or all characteristics with the other example methods, networks, and/or network components 100-600, 800, and 1900 discussed herein. As illustrated in FIG. 7, the network 700 includes a number of network components (e.g., cloud 760; vehicles 741, 742; access points 726, 737, 738; and mobility controller 735). The vehicles 741, 742; access points 726, 737, 738; and mobility controller 735 each contain what may be referred to herein as a "network unit" (NU), represented in FIG. 7 as having respective NUs. In the context of a vehicle, the NU may be part of, for example, an OBU, a mobile AP, and an MC, as previously described above.

In accordance with various aspects of the present disclosure, the mobile NUs may have a number of communication interfaces for various wired and wireless communication protocols, and may have access to a number of communication methodologies including, for example, a "DIRECT" communication methodology that involves direct communication with the destination entity, an "OPPORTUNISTIC" communication methodology that communicates with the destination entity only when one specific communication technology is available (e.g., one of dedicated short-range communication (DSRC) connectivity to a specific access-point, Bluetooth wireless connectivity, or cellular connectively), and an "EPIDEMIC" communication methodology that may deliver the message to the next available networking neighbor of the entity sending a message. The networking neighbor that is sent the message is then responsible for continuing the delivery of the message to its own neighbor node(s), thereby transporting the message through various network entities until the final destination is reached. In accordance with various aspects of the present disclosure, NUs that are "fixed" rather than "mobile" may be configured to rely on "DIRECT" communication methodologies. Additional details of communication methodologies may be found, for example, in U.S. Provisional Patent Application No. 62/272,750, entitled "Systems and Methods for Remote Software Update and Distribution in a Network of Moving Things," filed Dec. 30, 2015; and U.S. Provisional Patent Application No. 62/278,662, entitled "Systems and Methods for Remote Configuration Update and Distribution in a Network of Moving Things," filed Jan. 14, 2016, the complete subject matter of each of which is hereby incorporated herein by reference, in its respective entirety.

A network of moving things in accordance with various aspects of the present disclosure is able to communicate data with both mobile and fixed NUs. For example, the mobile NUs 724, 725 in their respective vehicles 742, 741 of FIG. 7 may not have continuous access to or communication with the data storage of cloud 760. In accordance with various aspects of the present disclosure, such mobile NUs may leverage any existing communication connections that are available such as, for example, cellular, DSRC, or other suitable communication technology. In accordance with various aspects of the present disclosure, mobile NUs such as, for example, the NUs 725, 724 of their respective vehicles 741, 742 of FIG. 7 may, for example, communicate with fixed NUs such as, for example, the NUs 753, 737, 738 of FIG. 7, using the EPIDEMIC communication methodology, described above.

In accordance with various aspects of the present disclosure, various sensors (e.g., sensors connected to NU 730) may not have direct access to or communication with the data storage of the cloud 760, and therefore may leverage the connectivity provided by an NU such as, for example, the "relay" NU 724 of vehicle 742, to which they may connect. Such relay NUs (RNUs) may communicate with any such sensors, in order to enable any such sensors to communicate sensor data with, for example, the cloud 760.

The ever growing volume of information generated by the huge variety of connected devices raises constant challenges in providing reliable transport for that data. Within a few years, with the continued proliferation of the Internet of Things and further deployment of smart sensors, the transportation of the growing volume of data generated by such devices will present a tremendous challenge not only in terms of the amount of bandwidth required, but also with regard to connectivity costs.

A network in accordance with various aspects of the present disclosure, which may be referred to herein as the "Internet of Moving Things" (IoMT), provides a platform that is highly optimized for the transport of data generated by, for example, various sensors in the area served by such a network, in a very scalable way. Additional details regarding interfacing among sensors and a network in accordance with various aspects of the present disclosure may be found, for example, in U.S. Provisional Patent Application No. 62/222,135, entitled "Systems and Methods for Collecting Sensor Data in a Network of Moving Things," filed Sep. 22, 2015. Additional details regarding adapting the granularity, bandwidth, and priority of sensing and disseminating data may be found, for example, in U.S. Provisional Patent Application No. 62/253,249, entitled "Systems and Methods for Optimizing Data Gathering in a Network of Moving Things," filed Nov. 10, 2015. The complete subject matter of each of the above-identified provisional patent applications is hereby incorporated herein by reference, in its respective entirety.

As will be recognized by those of skill in the art, all of the data collected by elements in a network of moving things is potentially valuable for a wide variety of applications and insights, most of which are yet to be discovered. End-to-end data integrity is important in any network, and is particularly so in a network such as the IoMT of the present disclosure, considering the variety of elements and processes involved in its acquisition. At the present time, just a small fraction of the data collected from connected devices is actually being used. However, network support for the collection of high definition data is of increasing importance. A network in accordance with various aspects of the present disclosure provides the foundations for an analytics system that uses collected sensor and other data to provide, for example, optimizations and predictions in a wide variety of different areas (e.g., transportation, environment, and/or communication).

Figure 8:
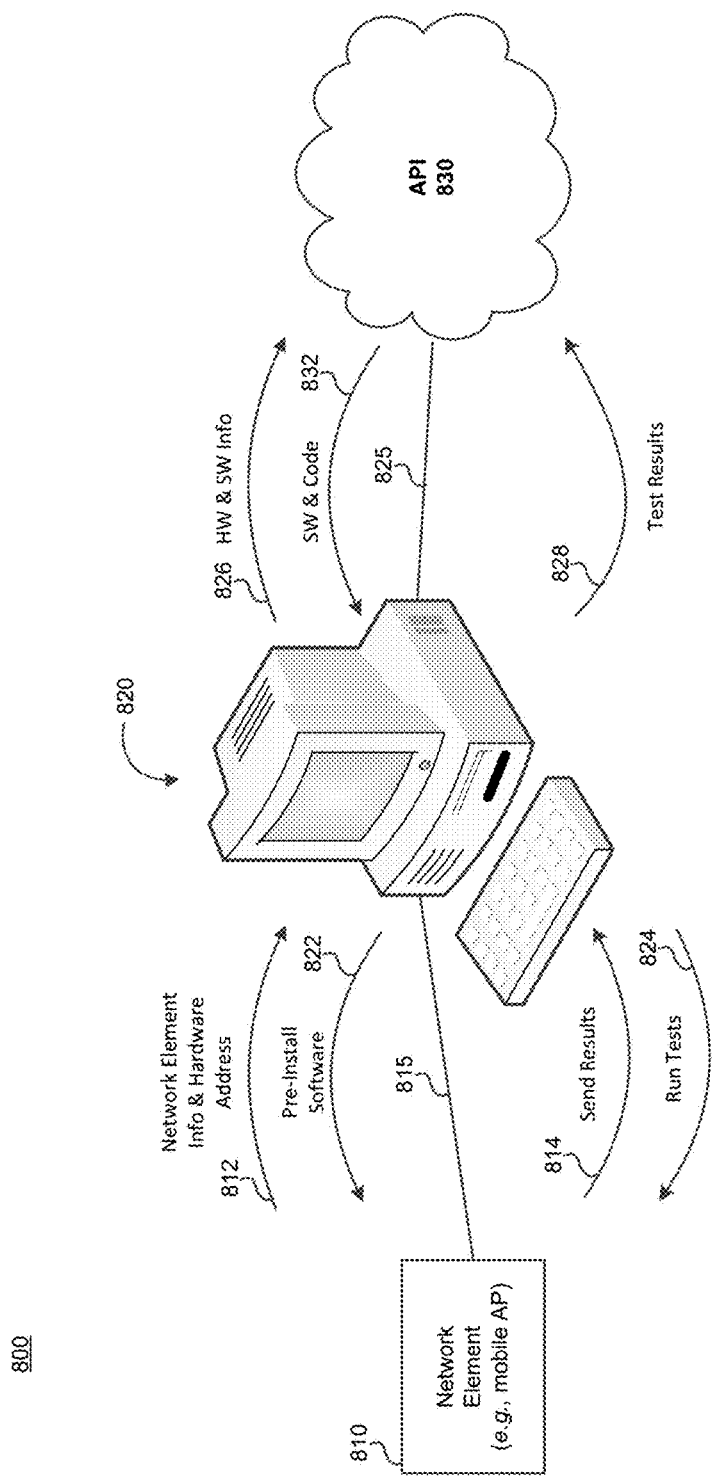
FIG. 8 is a block diagram illustrating an example configuration of and flow of information between the principle functional components of a system used in the process of pre-installing or provisioning a network element such as, for example, an on-board unit (OBU) or network unit (NU), in accordance with various aspects of the present disclosure.

FIG. 8 is a block diagram illustrating an example configuration of and flow of information between the principle functional components of a system 800 used in the process of pre-installing or provisioning a network element such as, for example, an on-board unit (OBU) or network unit (NU), in accordance with various aspects of the present disclosure. As shown in FIG. 8, the system 800 is composed of three principle elements, a network element 810 of a network of moving things such as, for example, an OBU or NU; a computer-based workstation 820 running, for example, a software application supporting a suitable graphical user interface (GUI); and an application programming interface (API) 830 for communicating with Cloud-based resources supporting the process of pre-installation or provisioning of network elements (e.g., NUs, OBUs, MCs) for deployment. The network element 810 may be connected to the workstation 820 by a wired or wireless communication link 815 that may be any suitable form of data communication technology (e.g., Universal Serial Bus (USB), Ethernet, Wi-Fi, RS-232C, RS-422, RS-485), while the workstation 820 may be connected to the API 830 by any suitable wired or wireless communication link such as, for example, the communication link 825 (e.g., Ethernet, Wi-Fi, cellular, Digital Subscriber Line (DSL)). The end-result of the pre-installation or provisioning process in accordance with various aspects of the present disclosure is a network element that is properly programmed and tested in order to guarantee that the network element meets the desired quality standards such as when operating in a network such as that described herein. Additional information about an example network element that may be provisioned or pre-installed for use in a network of moving things in accordance with various aspects of the present disclosure may be found in, for example, U.S. Provisional Patent Application No. 62/273, 878, entitled "Systems and Methods for Reconfiguring and Adapting Hardware in the Network of Moving Things," filed Dec. 30, 2015, the complete subject matter of which is hereby incorporated herein by reference, in its entirety.

The GUI of the workstation 820 is part of a software application that allows a workstation operator to process each network element 810, so that upon completion of the provisioning/pre-installation process, the network element 810 is ready for deployment within a network of moving things, in accordance with various aspects of the present disclosure. The software application running on the workstation 820 is also responsible for managing interactions with various elements of the system 800 of FIG. 8 that are connected to the workstation 820, which are used during the pre-installation/provisioning process and are described in greater detail, below, with respect to FIG. 19.

The API 830 of FIG. 8 represents an interface to a set of resources located on, for example, the Cloud (e.g., Cloud 760 of FIG. 7). The API 830 enables the workstation 820 to access software, firmware, data, and/or configuration information 832 in the form of, for example, binary images of executable code for installation on the network element being provisioned/pre-installed, and to access resources used to, for example, upload to the Cloud hardware and software information 826 that identifies the hardware, software, and/or firmware of the network element being provisioned/pre-installed, including test results 828 produced by testing performed upon the network element being provisioned/pre-installed.

In order to ready a network element for deployment in a network of moving things according to various aspects of the present disclosure, the workstation 820 may engage in a number of actions including exchanges of data with the network element being provisioned/pre-installed and with the resources of the Cloud (e.g., via the API 830), and may engage in a series of tests of the network element and reporting of the test results to the resources of the Cloud (e.g., again using the API 830). For example, the software application on the workstation 820 may access (e.g., receive or retrieve) information 812 from the network element 810 characterizing components (e.g., electrical circuitry/hardware and/or software/firmware) of the network element. The workstation 820 may then, based upon the received information characterizing the components of the network element, retrieve/receive the most recent software, firmware, data, parameters, and/or configuration information 832 (e.g., from the Cloud) using, for example, the resources of the API 830. The software application on the workstation 820 may then perform the installation of the software, firmware, data, and/or configuration information 822 on the network element (e.g., OBU, NU, MC), and may perform any indicated tests 824 and collect the results 814 for each test performed upon the network element. The results of testing each network element may then be sent 828 to the resources of the Cloud for storage for the network element 810, using the API 830. The software application of the workstation 820 may then receive identifying information that may be assigned to the network element being processed, to permit the workstation 820 to produce a label (e.g., human readable and/or able to be optically scanned (e.g., a one or two dimensional optical code such as a bar code or "Quick Response" (QR) code) used to identify the network element.

The GUI of a software application of a workstation such as workstation 820 in accordance with various aspects of the present disclosure facilitates and automates the preparation of network elements for the process of deployment of the network elements into a network of moving things. The software application of the workstation 820 may be run, for example, on a desktop or laptop computer having a suitable display, and a communication interface (e.g., a wireless or wired communications interface) suitable to connect the workstation 820 to the network element being prepared for deployment (e.g., NU 810). Some of the steps performed during use of the software application of the workstation 820 are discussed below with respect to FIGS. 10-18. It should be noted that although the software application on the workstation 820 may be described as performing a sequence of operations as part of the deployment of a single network element, this does not necessarily represent a specific limitation of the present disclosure, unless specifically recited in the claims, as the various actions involved in the pre-installation/provisioning process described herein may be concurrently performed on two or more network elements by one or more suitably configured workstations 820.

Figure 9:
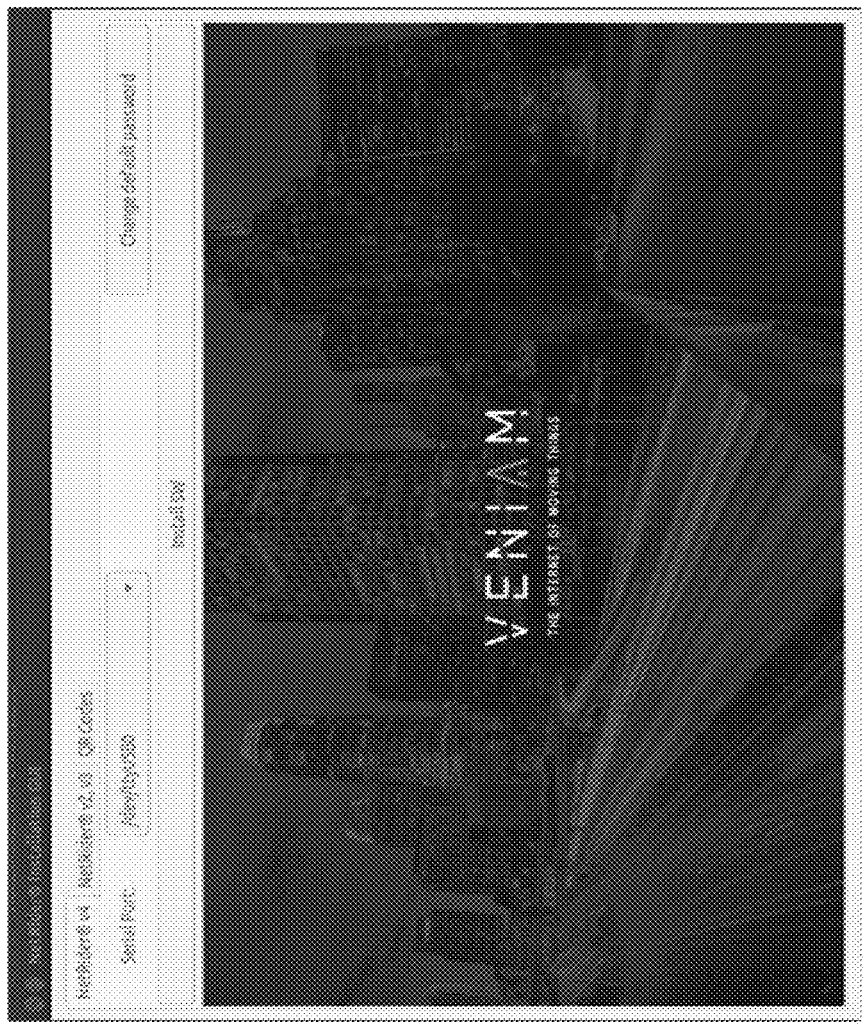
FIG. 9 is an illustration of an example screen that may be displayed by the software application of the workstation used for pre-installing/provisioning network elements such as for example, OBUs and NUs, in accordance with various aspects of the present disclosure.

FIG. 9 is an illustration of an example screen 900 that may be displayed by the software application of the workstation used for pre-installing/provisioning network elements such as for example, OBUs and NUs, in accordance with various aspects of the present disclosure. The example of FIG. 9 illustrates three tabs that may be used to select access to different information related to pre-installation/provisioning of network units. Two tabs of the example graphical user interface elements of FIG. 9 allow the user to select the version of the software that is to be installed in the network element being provisioned/pre-installed, while a third tab permits the user of the software application to access functionality related to display and production of machine-readable physical labels for network units being prepared for deployment.

The active tab shown in FIG. 9 is related to the pre-installation/provisioning of a network unit with one of two versions of software, firmware, data, and/or configuration information. The information displayed following selection of the active tab of FIG. 9 includes a user interface element to select a communications port of the workstation to be used in communicating such information to the network element being pre-installed/provisioned. A user interface element to change the default password is also provided under the active tab, to permit the user of the software application to change the password used to control access to the functionality of the network element after the completion of the present pre-installation/provisioning process.

Figure 10:
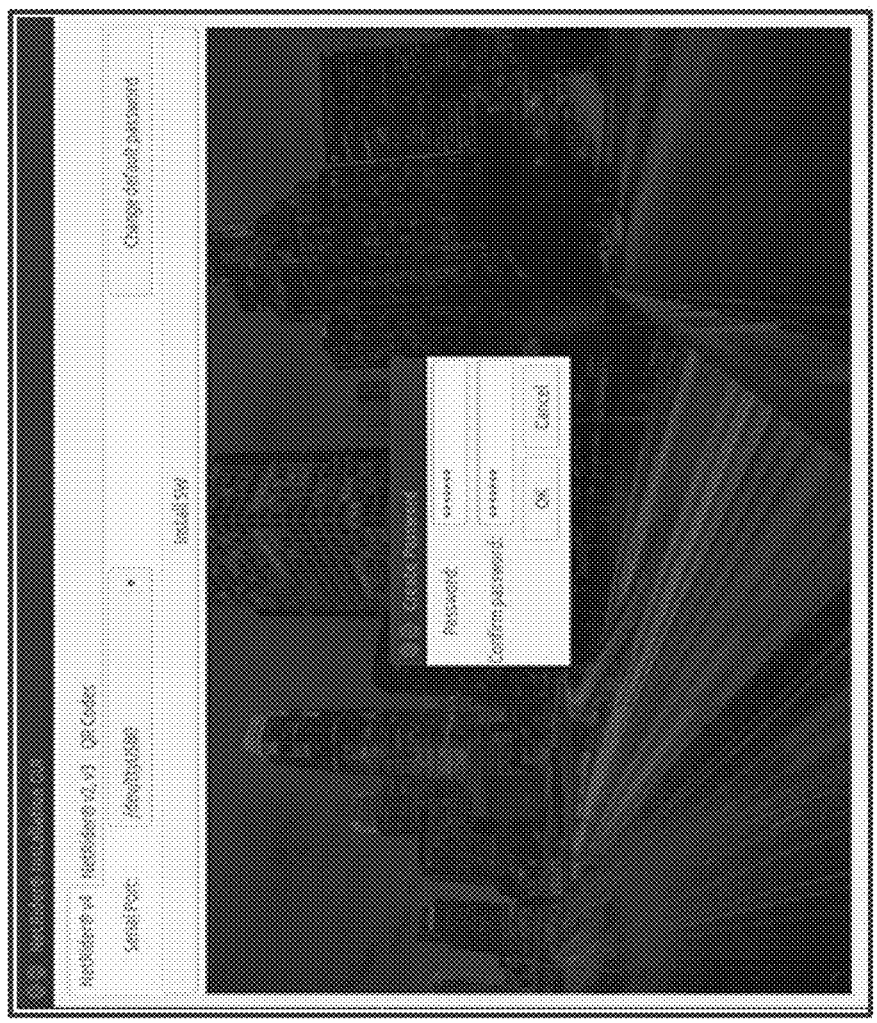
FIG. 10 is an illustration of another example screen that may be displayed by a software application of a workstation used for pre-installing/provisioning network elements such as for example, OBUs and NUs, in accordance with various aspects of the present disclosure.

FIG. 10 is an illustration of another example screen 1000 that may be displayed by a software application of a workstation used for pre-installing/provisioning network elements such as for example, OBUs and NUs, in accordance with various aspects of the present disclosure. The illustration of FIG. 10 shows a pop-up window that permits the user of the software application to create a "default password." The pop-up window of FIG. 10 may be displayed upon user selection of the "Change default password" user interface element of FIG. 9, for example. The illustration of FIG. 10 requires two entries of the desired password, to ensure correct input.

Figure 11:
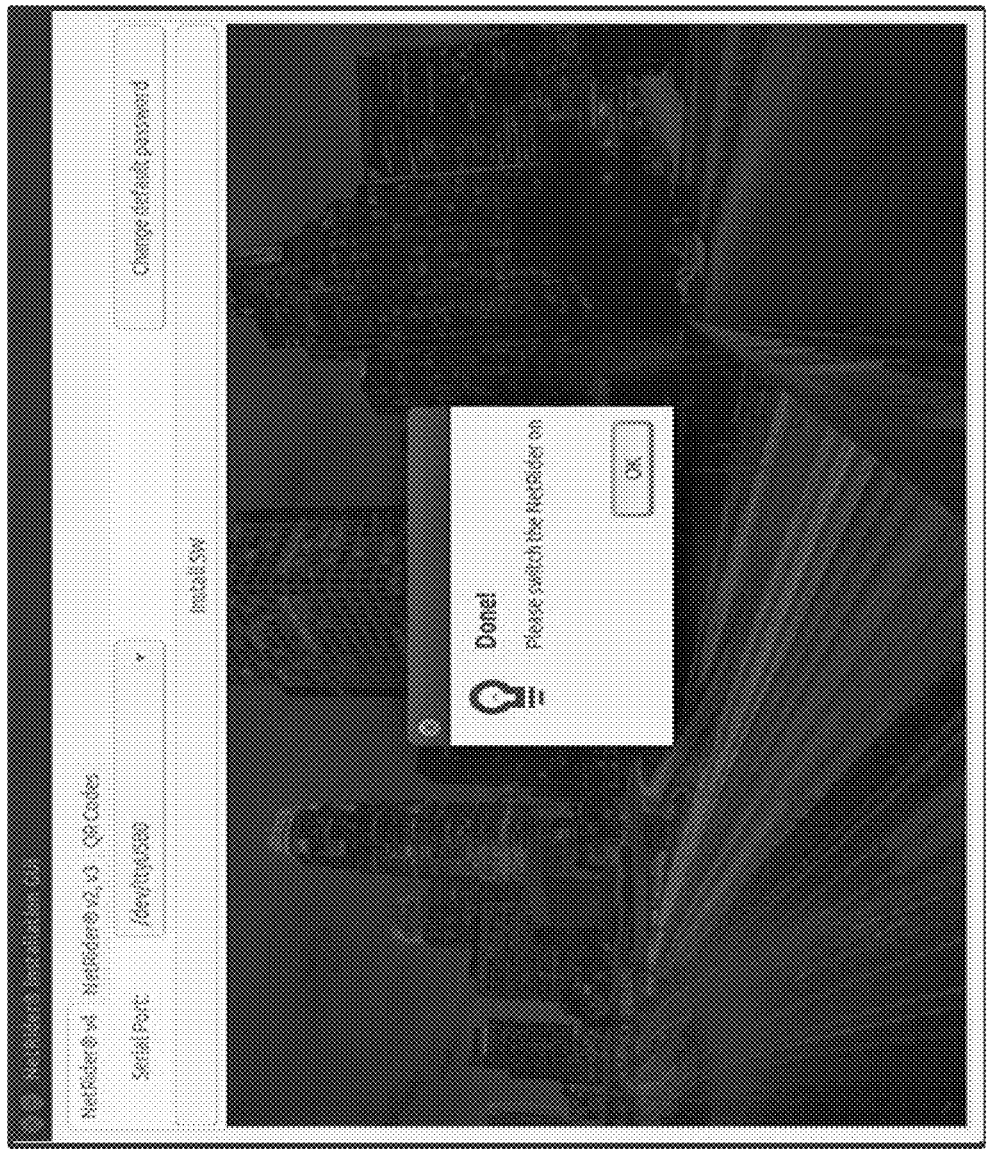
FIG. 11 is an illustration of yet another example screen that may be displayed by the software application of the workstation used for pre-installing/provisioning network elements such as for example, OBUs and NUs, in accordance with various aspects of the present disclosure.

FIG. 11 is an illustration of yet another example screen 1100 that may be displayed by the software application of the workstation used for pre-installing/provisioning network elements such as for example, OBUs and NUs, in accordance with various aspects of the present disclosure. The illustration of FIG. 11 shows a pop-up window that informs the user of the software application that preparation for pre-installing/provisioning a network element has been completed. The pop-up window of FIG. 11 may be displayed upon user selection of the "OK" command button displayed in the example pop-up window of FIG. 10. As shown in the illustration of FIG. 11, the pop-up window informs the user that the creation of a default password is completed, and displays a prompt to the user of the software application to turn on the network element to be pre-installed/provisioned, so that the pre-installation/provisioning process can proceed.

Figure 12:
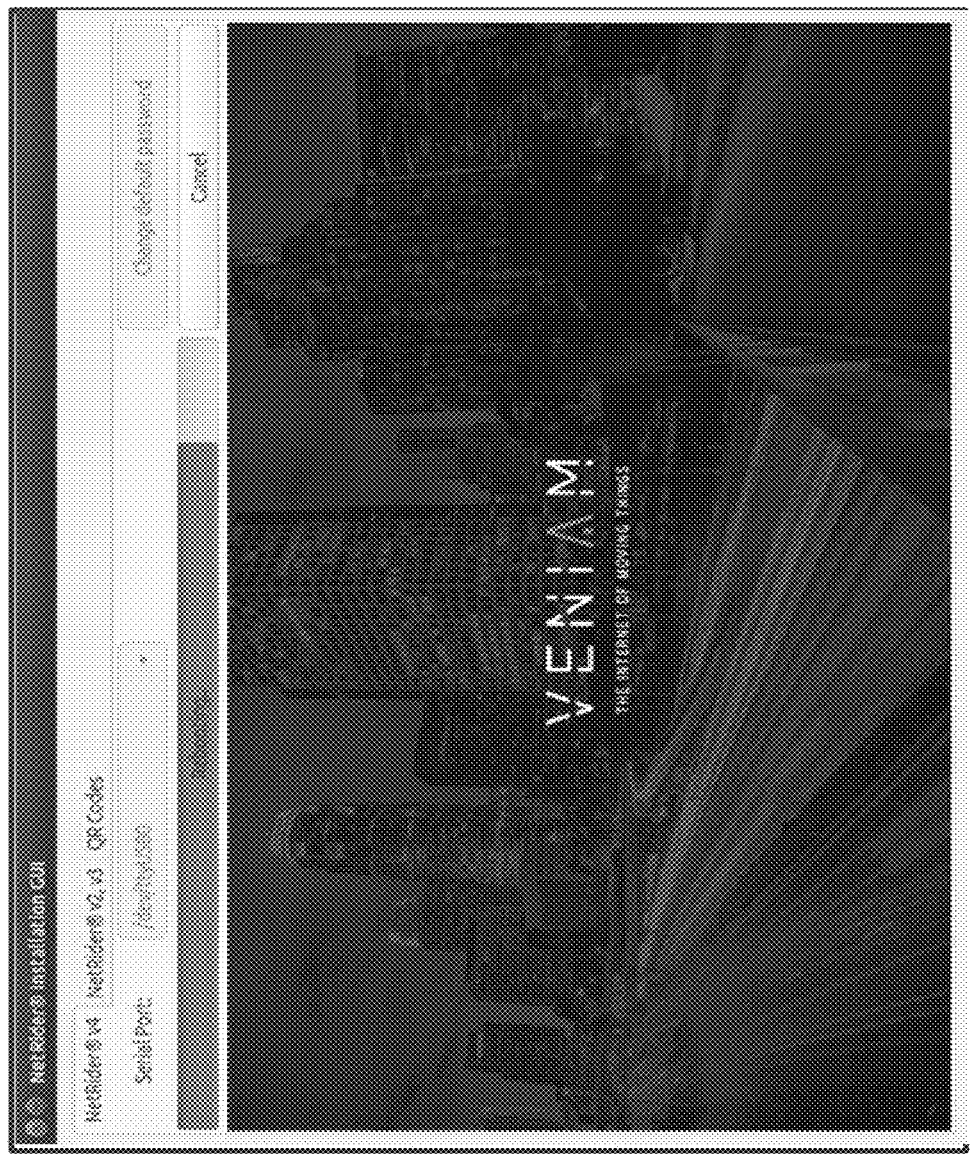
FIG. 12 is an illustration of an example screen that may be displayed by the software application of the workstation for pre-installing/provisioning network elements such as for example, OBUs and NUs, in accordance with various aspects of the present disclosure.

FIG. 12 is an illustration of an example screen 1200 that may be displayed by the software application of the workstation for pre-installing/provisioning network elements such as for example, OBUs and NUs, in accordance with various aspects of the present disclosure. The illustration of FIG. 12 includes a progress bar and a "Cancel" command button, which may be shown to the user to indicate the amount of work completed or the stage in the process of pre-installing/provisioning the network element (e.g., OBU or NU) connected to the workstation on which the software installation screen 1200 appears.

Figure 13:
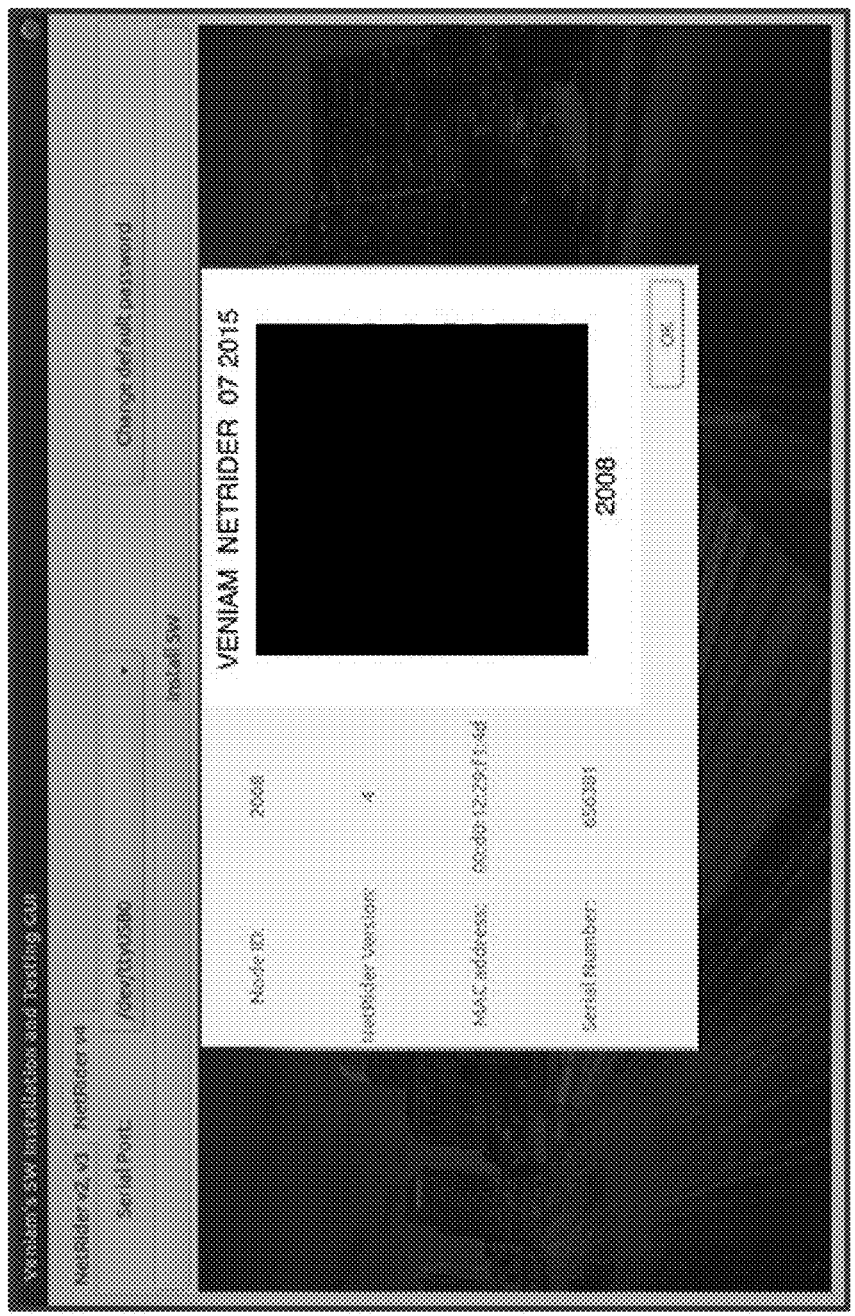
FIG. 13 is an illustration of an example screen that may be displayed by the software application of the workstation used for pre-installing/provisioning network elements such as for example, OBUs and NUs, in accordance with various aspects of the present disclosure.

FIG. 13 is an illustration of an example screen 1300 that may be displayed by the software application of the workstation used for pre-installing/provisioning network elements such as for example, OBUs and NUs, in accordance with various aspects of the present disclosure. The illustration of FIG. 13 shows a pop-up window that may be displayed by the software application of, for example, the workstation 820 of FIG. 8, following completion of pre-installation/provisioning of a network element according to aspects of the present disclosure. The pop-up window includes information including a node identifier (ID), a software and/or hardware version, a media access control (MAC) address, and a serial number, which are assigned to/associated with the network element for which the pre-installation/provisioning process is being performed. In addition, the pop-up window displays an image representing a label (e.g., a physical label containing, e.g., human readable, barcode, and/or QR code information) that has been assigned by, for example, the Cloud resource(s) with which the workstation communicates, to be printed and attached to the network element that has just completed the pre-installing/provisioning process. The software application of the workstation (e.g., workstation 820) provides functionality for printing of the label at the time of pre-installation/provisioning of the network device using a printer connected to the workstation. The software application may also permit the user to print replacements for those that have been lost or damaged based upon, for example, any of the identifiers assigned to/associated with the network element (e.g., node identifier, MAC address, or serial number). In some instances, the workstation running the software application may have an optical scanner connected to it, and the software application may permit the user of the software application to scan a label that is suitably encoded and located on, for example, a network units or any enclosure holding a network unit (e.g., a bag, box, or shipping carton or crate), to access (e.g., retrieve from the appropriate Cloud resource(s)) any of the information related to the identified network element.

Figure 14:
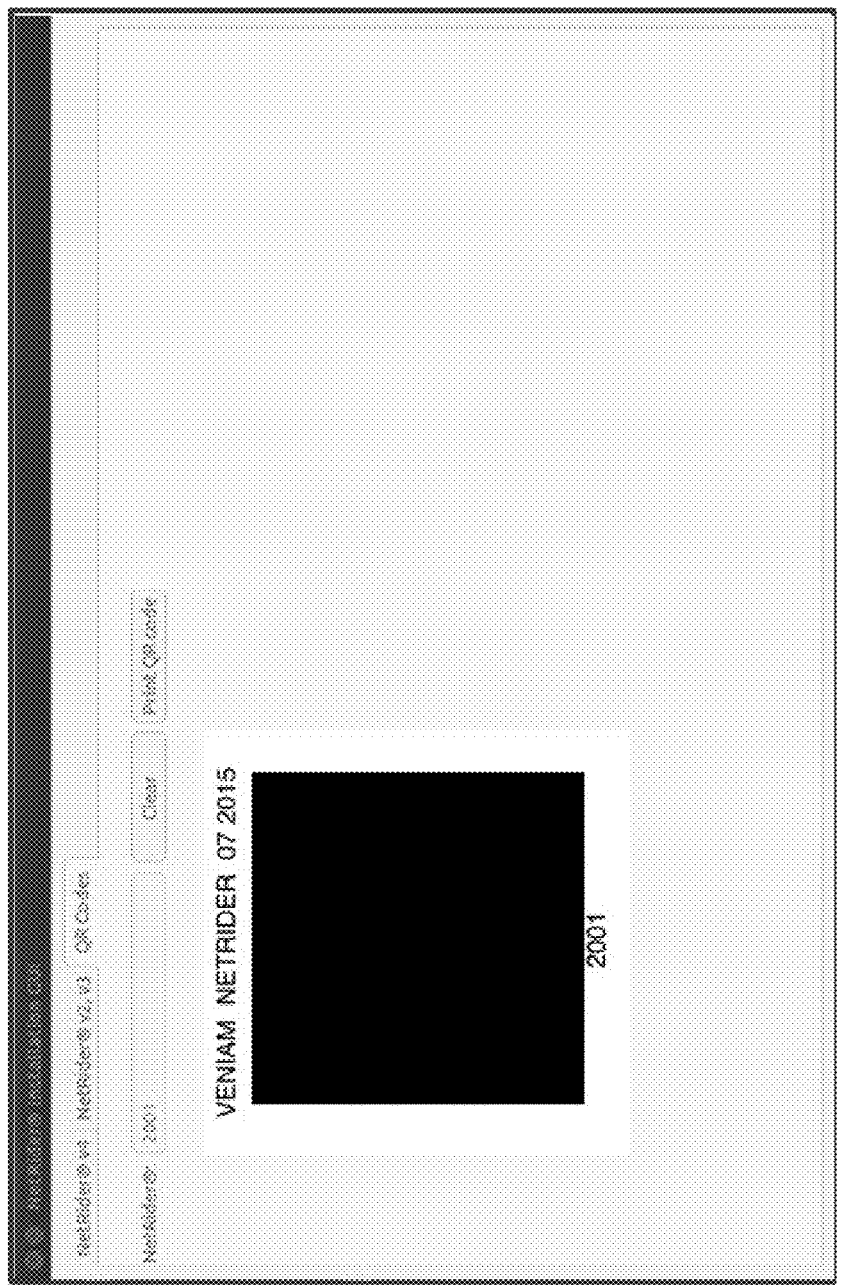
FIG. 14 is an illustration of an example screen that may be displayed by a software application of a workstation used for pre-installing/provisioning network elements such as for example, OBUs and NUs, in accordance with various aspects of the present disclosure.

FIG. 14 is an illustration of an example screen 1400 that may be displayed by a software application of a workstation used for pre-installing/provisioning network elements such as for example, OBUs and NUs, in accordance with various aspects of the present disclosure. The information shown by the example screen 1400 may be displayed upon selection of the "QR Codes" tab of the user interface of the software application, and includes a user interface element (e.g., a text box) to enable the user to enter an identifier of a particular network element or node (e.g., a node identifier, a MAC address, or a serial number), to permit the user to display an image of a label corresponding to the entered network element identifier. The screen 1400 of FIG. 14 also includes a "Print QR code" user interface element that the user may select to cause a physical label for an identified network element to be printed. Although the present disclosure describes examples of the use of labels containing identifying information that is human readable and/or able to be optically scanned, this aspect does not necessarily represent a specific limitation of the concept discussed herein, unless recited by the claims, as other ways of identifying a network element may be supported by the software application of the workstation (e.g., workstation 820 of FIG. 8) used such as, by way of example and not limitation, radio frequency identification (RFID) tags, near-field communication (NFC) devices, and other human or machine readable, print and/or electronic, and wired or wireless information carriers or labels.

As suggested above, one of the main objectives of the process of pre-installation/provisioning is to automate the installation of digital information (e.g., the software, firmware, data, and/or provisioning information required for operation) onto the network element being prepared for deployment in the network. The digital information installed may comprise, for example, a bootloader, firmware, an operating system, and one or more system applications that provide the basic functionality of the network element. Later in the deployment process, the network element may download software, firmware, data, and/or configuration updates in order to meet the specific requirements of a client and/or partner in a network of moving things such as, for example, any functionality and/or behavior requirements that may be imposed.

In accordance with various aspects of the present disclosure, the workstation (e.g., workstation 820 of FIG. 8) may access information about the context of each network element, which may be stored locally and/or remotely (e.g., in a Cloud-based system). The context information may include, by way of example and not limitation, the geographic location at which or vehicle in which the NU is to be deployed; and the level(s) of resources available on the NU (e.g., the speed of one or more processors in the NU, the amount of data storage (e.g., disk space, available flash and/or RAM memory) available in the NU, and information about what communication interfaces (e.g., IEEE 802.11p/a/b/g/n/ac, Bluetooth, IEEE 802.15 (e.g., Zigbee) are present on the NU). The context information for an NU may also include information specifying what testing of the NU is to be performed, and when such tests are to be done (e.g., during provisioning/pre-installation, at startup, upon detection of certain operating conditions of the NU, at certain times of day or according to the passing of a particular period of time (i.e., periodically)). A system in accordance with various aspects of the present disclosure may dynamically configure elements of the system, based on policies set at the workstation and/or the Cloud-based system, with regard to when piece of software will be configured on an NU (e.g., mobile AP), taking into account such factors as, for example, the level of resources available on the NU, the amount of storage available on the NU, the geographic location of the NU, among other factors such as those mentioned above, and others that have been contemplated. Some software packages/configurations may never be applied to/installed on a particular NU, if such software packages/configurations are not needed on the particular NU, and a system according to aspects of the present disclosure automatically detects when to apply the various software packages/configurations that may be available. In a system according to aspects of the present disclosure information, context information may identify what updates of software and/or configuration information are to be performed and when the identified updates are to be performed (e.g., based on network or NU conditions, date, time, and/or NU location), in addition to other particulars specific to the NUs of a network of moving things.

Tests performed while an NU is in service in the network may include, for example, none, some, or all of the tests performed during the provisioning/pre-installation process described herein. Tests run on an in-service NU may, for example, be performed periodically (e.g., each hour, once a day), and/or when a new configuration is employed in the network, when triggered by a specific client or condition (e.g., when insufficient memory is available, when an attempt to execute an undefined/prohibited processor instruction is detected, when the NU experiences wireless communication difficulties, when the NU (e.g., MAP) is in the vicinity of a specific geographic location, and/or when there are no users communicatively connected to the NU). Tests may run multiple times to verify that everything continues to be operating properly, and/or that a newly applied configuration was completed successfully. The availability and/or performance of such tests may be advertised by the workstation (e.g., workstation 820), and/or requested by the NU (e.g., a MAP).

In accordance with various aspects of the present disclosure, context information about the NUs may be dynamically configured from the workstation and/or the Cloud-based system. The context information may be communicated between the workstation and a Cloud-based system, and may be created, accessed, and/or modified by users and/or software-based systems of the workstation (e.g., workstation 820) and/or the Cloud-based system such as, for example, a software management system and/or configuration management system. An example of a suitable Cloud-based software management system may be found in U.S. patent application Ser. No. 15/157,887, entitled "Systems and Methods for Remote Software Update and Distribution in a Network of Moving Things," filed May 18, 2016. An example of a suitable configuration management system may be found in U.S. patent application Ser. No. 15/138,370, entitled "Systems and Methods for Remote Configuration Update and Distribution in a Network of Moving Things," filed Apr. 26, 2016. The complete subject matter of each of the above patent applications is hereby incorporated herein, in its respective entirety. In this way, a user of a system in accordance with various aspects of the present disclosure may employ the workstation (e.g., workstation 820) and/or the Cloud-based systems described above (e.g., a software management system and/or configuration management system) to dynamically and appropriately select and/or configure what software (e.g., applications, operating system, etc.) is to be installed on each NU; when the software is to be installed on each NU; what software is excluded from being installed/run on an NU; and/or what tests are to be done during provisioning/pre-installation and/or during operation of the NU in the network of moving things.

As will be recognized by those of skill in the art upon reading the present disclosure, the automation of the pre-installation/provisioning task greatly decreases the time needed to prepare a network element (e.g., an OBU or NU) for deployment, and ensures that the various subtasks of readying a network element for deployment (e.g., capturing identifying information; labeling; downloading of software, firmware, data, and/or configuration information; testing, and updating of repositories of such information) are performed in the proper order and without delay. Further, the automation reduces the likelihood of human error, avoiding errors in provisioning that may disable operation of the deployed network elements.

FIG. 15 is a table illustrating examples of types of tests that may be performed upon a network element during a process of preparing the network element for deployment in a network of moving things, in accordance with various aspects of the present disclosure. Following installation of software, firmware, data, and/or configuration information on a network element, the example set of tests shown in FIG. 15, or other different tests, may be performed to help ensure that all deployed network elements are fully functional and without defects. As may be seen in FIG. 15, the example set of tests includes only example software tests. This set of tests may be used when the hardware components of each network element have been thoroughly inspected before being accepted into the process of preparing network elements for deployment into a network of moving things, as described herein.

The pre-installation/provisioning process (e.g., software, firmware, data, and/or configuration installation and test processes) generates data that may be stored in a data repository such as, for example, a storage and processing resource located on, for example, the Cloud (e.g., Cloud 760 of FIG. 7). In accordance with various aspects of the present disclosure, such resources may be accessed through a suitable API (e.g., API 830 of FIG. 8), and reports may be generated using the collected and stored data, to aid in the management of the deployment of network elements and operation of a network of moving things in accordance with various aspects of the present disclosure. Two examples of report data resulting from the pre-installation/provisioning processes for deployment of network elements of a network of moving things are shown in FIGS. 16 and 17.

FIG. 16 illustrates an example network element assembly report 1600, in accordance with various aspects of the present disclosure. As shown in FIG. 16, the assembly report 1600 includes information identifying the network element (e.g., "node_id"), and associated information related to a main circuit board within the network element (e.g., the manufacturer or supplier "board_supplier," the board model "board_model," the board serial number "board_serial," and the board MAC address "board_mac_addr"). Information is also recorded for wireless interfaces of the network element including, for example, for IEEE 802.11p, the IEEE-802.11p interface manufacturer or supplier "11p_supplier," the interface model "11p_model," and the interface MAC address "11p_mac_addr." There is also information shown for an IEEE 802.11 a/b/g/n/ac interface including the identity of the IEEE 802.11 a/b/g/n/ac interface manufacturer or supplier "wifi_supplier," the interface model "wifi_model," the interface serial number "wifi_serial," and the interface MAC address "wifi_mac_addr;" and for a Bluetooth® interface including the interface manufacturer or supplier "bt_supplier," the interface model "bt_model," and an interface serial number "bt_serial." In accordance with various aspects of the present disclosure, various pieces of the information listed above may, for example, be manually entered by the operator of the workstation performing the pre-installation/provisioning process; may be acquired from the hardware, software, and/or firmware of devices in the network element by the workstation (e.g., workstation 820); may be provided by electronic data interchange with the manufacturer of parts of the network element; and/or may be collected by resources at the Cloud. Collecting, organizing, maintaining, and analyzing such information enables an operator of a network of moving things to track network elements, including various sub-elements or components of the network elements, so that network elements and component inventories may be tracked, and technical (e.g., software/firmware/hardware) problems may be detected, tracked, managed, and remedied in a timely and efficient fashion.

FIG. 17 illustrates an example network element setup and test report 1700, in accordance with various aspects of the present disclosure. As shown in FIG. 17, the example setup and test report 1700 includes information identifying the network element (e.g., "node_id"), as well as information associated with the network element including information identifying a network address for the network element (e.g., "mac_addr"), and the status of the testing performed (e.g., "tests passed," "tests_description," "last_test," and "author").

After validating data received from the workstation, resources at, for example, the Cloud (e.g., Cloud 760 of FIG. 7) may check whether a network element corresponding to the received data is already registered and, if not, may generate an identifier for the new network element. The received and validated information about the network element may then be used to generate information for label (e.g., human readable and/or able to be optically scanned (e.g., a barcode or QR code)), which is sent back to the software application running on the workstation (e.g., workstation 820 of FIG. 8) that is used for the pre-installation/provisioning process.

The various pieces of information (e.g., data sets) collected from the whole pre-installation/provisioning and deployment process may later be used to run data analytics that produce, for example, information on defective network elements percentage, efficiency of the pre-installation/provisioning and deployment processes, and/or inventory analysis, in addition to the use of the data sets as a registry of network elements already deployed and those available for deployment. Test results data may be used to flag faulty network elements that are to receive further testing, repair, and that may later be submitted again to the pre-installation/provisioning process as part of the operational workflow of operating a network of moving things.

Figure 18:
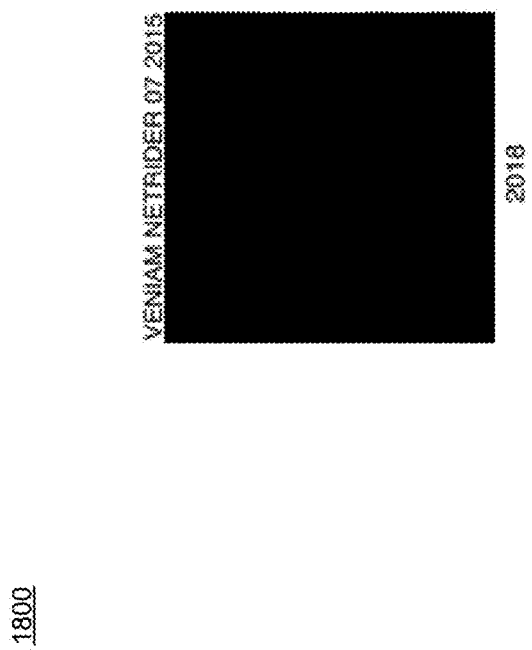
FIG. 18 shows an illustration of an example QR code label for assignment to a network element of a network or moving things, in accordance with various aspects of the present disclosure.

FIG. 18 shows an illustration of an example QR code label for assignment to a network element of a network or moving things, in accordance with various aspects of the present disclosure. Every network element (e.g., OBU or NU) in a network of moving things may be easily and uniquely identifiable through the use of such a label, in order to facilitate fleet and operations management. In order to accomplish this, every network element may be assigned a unique identifier (e.g., a node or network element ID) which is used to generate a QR code like the one shown in FIG. 18. As described above, multiple copies of each label graphic for a network element (e.g., a human readable and/or optically readable barcode or QR code label) may be printed, with individual labels being placed at different physical locations associated with the network element such as, for example, a particular surface or location (e.g., a "front panel" or inside of a "top" or "lid") of the network element, and/or on a container (e.g., bag, box, carton, and/or pallet) via which the network element is shipped. In this manner, each network element may be easily identified at any stage of deployment.

Figure 19:
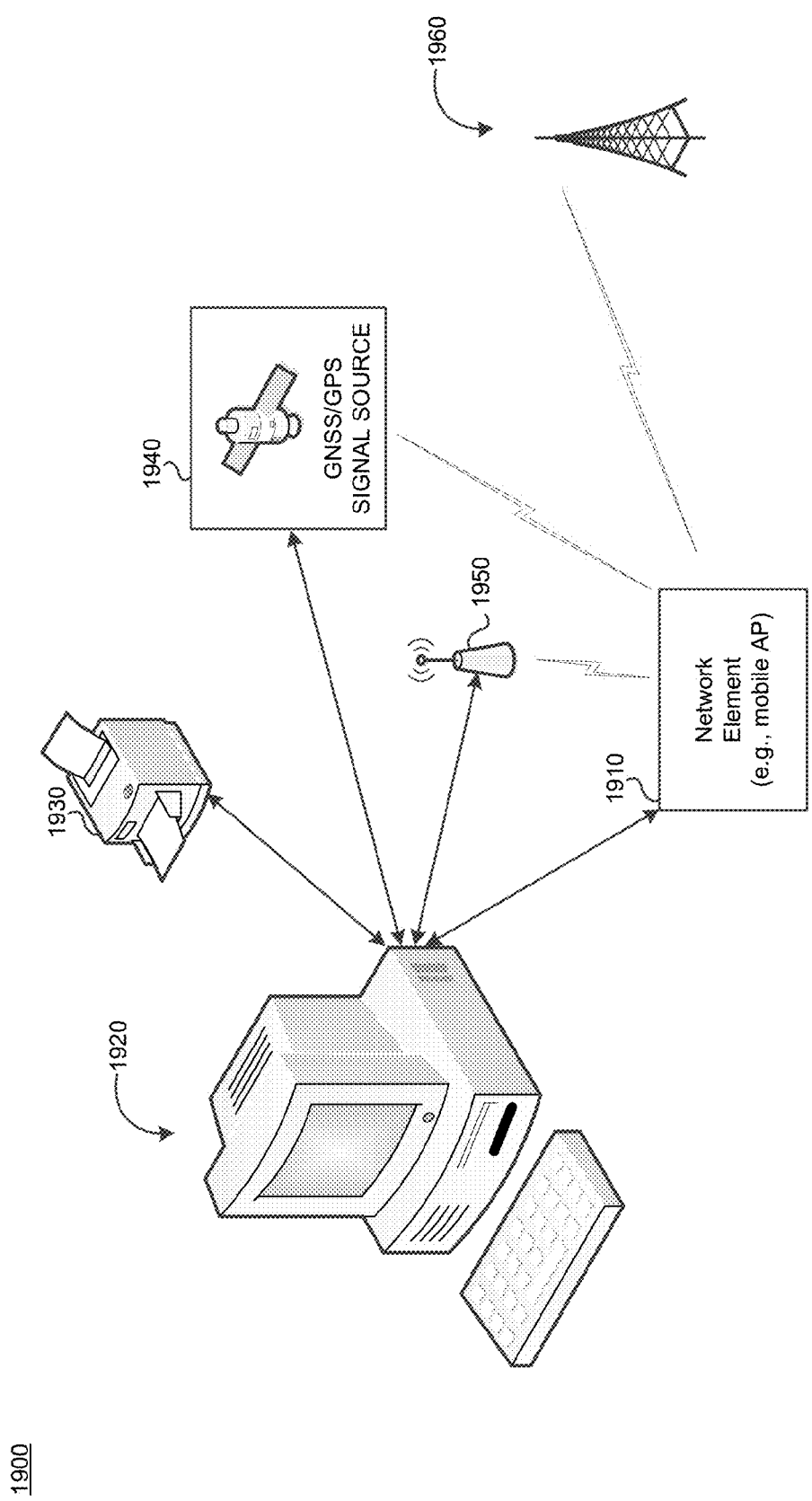
FIG. 19 shows a block diagram illustrating the various components used as part of an example workstation that may correspond to, for example, the workstation of FIG. 8, in accordance with various aspects of the present disclosure.

FIG. 19 shows a block diagram illustrating the various components used as part of an example workstation 1900 that may correspond to, for example, the workstation 820 of FIG. 8, in accordance with various aspects of the present disclosure. As shown in example illustrated in FIG. 19, the workstation 1900 includes a laptop or desktop computer 1920 having a display device, on which a software application according to various aspects of the present disclosure has been installed. The workstation 1900 also includes a communications interface that connects the computer 1920 to the network element 1910 that is to be processed for deployment. The communications interface to the network element 1910 being processed may be, by way of example and not limitation, a USB or serial interface.

In addition, the workstation 1900 includes a printer 1930 suitable for printing the labels for each processed network element. As discussed above, multiple labels may be printed with information that is readable using an optical scanner such as, for example, a one or two dimensional barcode (e.g., a QR code) and may also contain human readable matter, as illustrated in FIGS. 13, 14, and 18. Such a printer may be capable of printing on self-adhesive label stock. A printer suitable for printing self-adhesive labels may be similar to, for example, the model GK420t from Zebra Technologies.

The workstation 1900 illustrated in FIG. 19 also includes a GNSS/GPS signal source 1940 to generate suitable radio frequency signals used in testing the ability of the network element 1910 to receive and appropriately process the GNSS/GPS information encoded in the RF signals. The GNSS/GPS signal source 1940 may be linked to and controlled by the software application running on the computer 1920 in order for the testing of the network element 1910 to be completed. In this way, the software application of the workstation 1900 may adjust the parameters of the generated GNSS/GPS signal to test the behavior and performance of the network element 1910. To accomplish this objective, a GPS/GNSS simulator unit similar to, for example, the GSG-5 Series Multi-channel Advanced GNSS Simulator from Spectracom Corporation, or the LabS at 3 GPS Simulator from Racelogic Ltd., may be used.

The workstation 1900 shown in FIG. 19 also includes an access point 1950 to enable testing of wireless communication by the network element 1910 using various wireless communication standards to be supported by the network element 1910 such as, for example, IEEE 802.11p, IEEE 802.11a/b/g/n/ac, and Bluetooth® air interfaces, to name just a few possible wireless communication standards that may be supported by a network element in accordance with various aspects of the present disclosure. For this purpose, a NetRider AP from Veniam may be used, as it provides all of the required interfaces and technologies to proceed with the tests.

In addition, although in some implementations a cellular network simulator may be employed, in other implementations such equipment may not be a part of the workstation 1900, and the use of the workstation 1900 for processing (e.g., pre-installing/provisioning/testing) each network element 1910 for deployment may involve reliance on the network element 1910 receiving signals from or communicating with a commercial cellular network infrastructure such as the cellular network infrastructure represented in FIG. 19 as cellular network infrastructure 1960. It should be noted that communication via a commercial cellular network infrastructure such as that represented by cellular network infrastructure 1960 may be used to support the network element 1910 when in operation in a network of moving things in accordance with various aspects of the present invention. Therefore, to complete thorough testing of the network element 1910, reception of signals from, or communication via a commercial cellular infrastructure may be necessary for complete and robust evaluation of the operation of the network element 1910.

In addition, it should be noted that additional devices may be linked via communication interfaces to the computer 1920 of workstation 1900. For example, an optical scanner, not shown in FIG. 19, may be used as described above to scan labels of network elements being processed or re-processed. The software application running on computer 1920 may be configured to accept signals from such an optical scanner, to enable user scanning of information on existing labels of network elements.

The workstation shown in FIG. 19, running the software application described above, enables the automation of the example pre-installation/provisioning process described herein. The various components of the workstation 1900 of FIG. 19 help to minimize the work of a user and the time needed for pre-installing/provisioning a network element for deployment, while reducing the likelihood of user error. In accordance with various aspects of the present disclosure, the user of the workstation 1900 may only be required to connect the workstation 1900 to the network element 1910 being processed, and then to initiate the processing of the network element 1910 using the user interface of the software application.

It will be recognized upon achieving an understanding of the present disclosure that access to the information collected using the method and system described herein gives way to more sophisticated inventory management, including effective overview of all manufacturers and distributors involved in the supply chain of the network elements of the present disclosure, and elimination or minimization of disruptive stock shortages. In accordance with various aspects of the present disclosure, information collected as each network element is prepared for deployment may immediately be made available from resources (e.g., a Cloud resource) accessible via the Internet. In addition, the collection of information such as that identified above may be used to provide reports useful for multiple organizations involved in a network of moving things such as, for example, operations, accounting, and general management. The process described herein allows an operator of a network of moving things to ready network elements for deployment using a single process, regardless of needs of clients or partners.

Through the use of various aspects of the present disclosure, an operator of a network of moving things can decrease the costs associated with deployment of network elements, including the evaluation of inventory needs, preparation of network elements to be deployed including software installation and testing, and controlled storage of the network elements. Moreover, by keeping all of the information about the processing of network elements as described herein on a Cloud-based resource, the reporting needs of multiple different organizations may be more easily met. Further, the use of methods and systems in accordance with various aspects of the present disclosure help to reduce the amount of time consumed per network element deployed, via a fully automated process that efficiently takes network elements from received hardware units to devices ready for deployment, which is of significant value where deployments of networks of moving things involve thousands of network elements needing to be processed. The systems and methods of the present disclosure enable integration with $3^{rd}$ party software for inventory and stock management.

Various aspects of the present disclosure may be found in a system for self-initialization and automated bootstrapping of a mobile device for use in a network or moving things. Such a system may comprise a computer system comprising a software application having executable instructions for generating a user interface on a connected display device. The computer system may be configured to communicatively couple to the mobile device and to a cloud-based system storing configuration information for operating the mobile device in the network and one or more of software and firmware code executable by the mobile device. The system may also comprise a satellite signal generator controllable by the computer system to produce one or more radio frequency signals that simulate transmissions from satellites of a global navigation satellite system, where the satellite signal generator may be operably coupled to the computer system. The system may further comprise a wireless access point controllable by the computer system to communicate with the mobile device using radio frequency signals as a plurality of different elements of the network. The software application may direct the computer system to at least, receive, from the mobile device, information characterizing components of the mobile device. The software application may also direct the computer system to install one or more of software, firmware, and configuration information on the mobile device, based on the information characterizing components of the mobile device. In addition, the software application may test the mobile device by controlling the satellite signal generator and the wireless access point, according to the configuration information. The system may further comprise a cellular communication network signal generator controllable by the computer system to transmit and receive radio frequency signals that simulate communication with one or more wireless cellular network base stations.

In accordance with various aspects of the present disclosure, installing one or more of software, firmware, and configuration information on the mobile device may comprise retrieving the one or more of software, firmware, and configuration information for the mobile device from the cloud-based system, based upon the received information characterizing the components of the mobile device. Testing the mobile device may comprise collecting results for each test performed upon the mobile device, and forwarding the collected results to the cloud-based system in storage for the mobile device. Testing the mobile device may comprise receiving identifying information assigned to the mobile device by the cloud-based system, and producing one or both of a human readable label and an electronically readable label, using the identifying information. The plurality of different network elements may comprise one or both of a second mobile device and a fixed access point device. The configuration information may comprise configuration parameters that control communication methodologies used by the mobile device to communicate with devices of the network, and the communication methodologies may comprise one or both of a communication methodology that employs only a specific type of wireless communication protocol and a communication methodology that employs any available type of wireless communication protocol. The software application may direct the computer system to define in the network at least one condition an occurrence of which causes identified software of the one or more of software and firmware code to be configured on the mobile device, and the at least one condition may comprise one or both of an occurrence of a particular operating condition in the mobile device and/or a current date matching a particular date.

Additional aspects of the present disclosure may be seen in a method of operating a computer system for self-initialization and automated bootstrapping of a mobile device for use in a network or moving things. Such a method may comprise generating a user interface on a display device, and communicatively coupling to the mobile device and to a cloud-based system storing configuration information for operating the mobile device in the network and one or more of software and firmware code executable by the mobile device. The method may also comprise receiving, from the mobile device, information characterizing components of the mobile device; and installing one or more of software, firmware, and configuration information on the mobile device, based on the information characterizing components of the mobile device. In addition, the method may comprise testing the mobile device by controlling a satellite signal generator configurable to produce one or more radio frequency signals that simulate transmissions from satellites of a global navigation satellite system, and by controlling a wireless access point configurable to communicate with the mobile device using radio frequency signals as a plurality of different elements of the network. Testing the mobile device may comprise controlling a cellular communication network signal generator to transmit and receive radio frequency signals that simulate communication with one or more wireless cellular network base stations.

In accordance with various aspects of the present disclosure, installing one or more of software, firmware, and configuration information on the mobile device may comprise retrieving the one or more of software, firmware, and configuration information for the mobile device from the cloud-based system, based upon the received information characterizing the components of the mobile device. Testing the mobile device may comprise collecting results for each test performed upon the mobile device; and forwarding the collected results to the cloud-based system in storage for the mobile device, and testing the mobile device may comprise receiving identifying information assigned to the mobile device by the cloud-based system, and producing one or both of a human readable label and an electronically readable label, using the identifying information. The plurality of different network elements may comprise one or both of a second mobile device and a fixed access point device. The configuration information may comprise configuration parameters that control communication methodologies used by the mobile device to communicate with devices of the network, and the communication methodologies may comprise one or both of a communication methodology that employs only a specific type of wireless communication protocol and a communication methodology that employs any available type of wireless communication protocol. The method may comprise defining in the network at least one condition an occurrence of which causes identified software of the one or more of software and firmware code to be configured on the mobile device, and the at least one condition may comprise one or both of an occurrence of a particular operating condition in the mobile device and/or a current date matching a particular date.

Further aspects of the present disclosure may be observed in a non-transitory computer-readable medium having stored thereon, a computer program having at least one code section. The at least one code section may be executable by a computer system for causing the computer system to perform operations for self-initialization and automated bootstrapping of mobile devices for use in a network or moving things, where the operations comprise the steps of the method described above.

In summary, various aspects of this disclosure provide systems and methods self-initialization and automated bootstrapping of mobile access points in a network of moving things. As non-limiting examples, various aspects of this disclosure provide systems and methods for adapting fixed access point coverage and/or power input/output in a network of moving things, adapting fixed access point backhaul communication, etc. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A system for provisioning of both fixed network devices and mobile network devices for deployment in a wireless network comprising a plurality of network devices, the system comprising:
   a computer system comprising a display device, the computer system configured to communicate directly with a current network device of the plurality of network devices, at the workstation, and to communicate with a cloud-based system storing executable code for operation of the plurality of network devices and configuration information that enables direct wireless communication among the plurality of network devices;
   a satellite signal generator controllable by and operably coupled to the computer system to produce one or more radio frequency signals that simulate transmissions from satellites of a global navigation satellite system, based upon the configuration information for the current network device;
   one or more wireless communication interfaces operably coupled to the computer system to communicate directly with the current network device using radio frequency signals, wherein the one or more wireless communication interfaces are configurable by the computer system to operate using a wireless local area network communication protocol and to operate using a wireless vehicle to vehicle communication protocol;
   wherein the software application directs the computer system to, at least:
      receive, from the current network device, information characterizing components of the current network device;
      send, to the cloud-based system, the information characterizing components of the current network device;
      receiving, for the current network device from the cloud-based system, the executable code and the configuration information comprising:
         an identifier assigned to the current network device by the cloud-based system, wherein the identifier uniquely identifies the current network device in the network,
         one of a geographic location at which the current network device is to be stationed or an identifier of a vehicle with which the current network device is to be stationed, and
         a representation of an arrangement of the plurality of network devices with respect to one another;
      install the executable code and the configuration information on the current network device; and
      test the current network device by controlling the satellite signal generator and the one or more wireless communication interfaces, according to the configuration information.

2. The system according to claim 1, further comprising:
   a cellular communication network signal generator controllable by and operably coupled to the computer system to transmit and receive radio frequency signals that simulate communication of one or more wireless cellular network base stations with the current network device.

3. The system according to claim 1, wherein testing the current network device comprises:
   collecting results for each test performed upon the current network device; and
   forwarding the collected results to the cloud-based system in storage for the current network device.

4. The system according to claim 1, wherein testing the current network device comprises:
   causing a device operably coupled to the computer system to physically print on a medium, one or both of a human readable label and an electronically readable label, using the configuration information.

5. The system according to claim 1, wherein the configuration information comprises one or more configuration parameters that control selection, by the current network device, of a communication methodology from a plurality of available communication methodologies for use by the current network device to communicate information to other network devices of the plurality of network devices.

6. The system according to claim 5, wherein the plurality of communication methodologies comprises:
   a communication methodology that employs only a specific wireless communication protocol to communicate with a destination network device of the plurality of network devices,
   a communication methodology that employs any wireless communication protocol available on the current network device to communicate directly with the destination network device, and
   a communication methodology that communicates with the destination network device via any network device of the plurality of network devices that is within wireless communication range of the current network device.

7. The system according to claim 1, wherein the software application directs the computer system to define at least one condition an occurrence of which causes identified software of the executable code to be updated on the current network device.

8. The system according to claim 7, wherein the at least one condition comprises one or both of an occurrence of a particular operating condition in the current network device and/or a current date matching a particular date.

9. A method of operating a computer system for provisioning of both fixed network devices and mobile network devices for deployment in a wireless network comprising a plurality of network devices, the method comprising:
   generating a user interface on a display device;
   communicating directly with a current network device of the plurality of network devices using radio frequency signals and communicating with a cloud-based system storing executable code for operation of the plurality of network devices and configuration information that enables direct wireless communication among the plurality of network devices;
   receiving, from the current network device, information characterizing components of the current network device;
   sending, to the cloud-based system, the information characterizing components of the current network device;
   receiving, for the current network device from the cloud-based system, the executable code and the configuration information comprising:
      an identifier assigned to the current network device by the cloud-based system, wherein the identifier uniquely identifies the current network device in the network,
      one of a geographic location at which the current network device is to be stationed or an identifier of a vehicle with which the current network device is to be stationed, and a representation of an arrangement of the plurality of network devices with respect to one another;

installing the executable code and the configuration information on the current network device; and testing the current network device by controlling a satellite signal generator configurable to produce one or more radio frequency signals that simulate transmissions from satellites of a global navigation satellite system and by controlling one or more wireless communication interfaces operably coupled to the computer system to communicate directly with the current network device using radio frequency signals, wherein the one or more wireless communication interfaces are configurable by the computer system to operate using a wireless local area network communication protocol and to operate using a wireless vehicle to vehicle communication protocol, according to the configuration information.

10. The method according to claim 9, wherein testing the current network device comprises controlling a cellular communication network signal generator to transmit and receive radio frequency signals that simulate communication of one or more wireless cellular network base stations with the current network device.

11. The method according to claim 9, wherein testing the current network device comprises:
collecting results for each test performed upon the current network device; and
forwarding the collected results to the cloud-based system in storage for the current network device.

12. The method according to claim 9, wherein testing the current network device comprises:
causing a device operably coupled to the computer system to physically print on a medium, one or both of a human readable label and an electronically readable label, using the configuration information.

13. The method according to claim 9, wherein the configuration information comprises one or more configuration parameters that control selection, by the current network device, of a communication methodology from a plurality of available communication methodologies for use by the current network device to communicate information to other network devices of the plurality of network devices.

14. The method according to claim 13, wherein the plurality of communication methodologies comprises:
a communication methodology that employs only a specific wireless communication protocol to communicate with a destination network device of the plurality of network devices,
a communication methodology that employs any wireless communication protocol available on the current network device to communicate directly with the destination network device, and
a communication methodology that communicates with the destination network device via any network device of the plurality of network devices that is within wireless communication range of the current network device.

15. The method according to claim 9, wherein the method comprises defining at least one condition an occurrence of which causes identified software of the executable code to be updated on the current network device.

16. The method according to claim 15, wherein the at least one condition comprises one or both of an occurrence of a particular operating condition in the current network device and/or a current date matching a particular date.

17. A non-transitory computer-readable medium having stored thereon, a computer program having at least one code section, the at least one code section being executable by a computer system for causing the computer system to perform operations for provisioning of both fixed network devices and mobile network devices for deployment in a wireless network comprising a plurality of network devices, the operations comprising:

generating a user interface on a display device;

communicating directly with a current network device of the plurality of network devices using radio frequency signals and with a cloud-based system storing executable code for operation of the plurality of network devices and configuration information that enables direct wireless communication among the plurality of network devices;

receiving, from the current network device, information characterizing components of the current network device;

sending, to the cloud-based system, the information characterizing components of the current network device;

receiving, for the current network device from the cloud-based system, the executable code and the configuration information comprising:
an identifier assigned to the current network device by the cloud-based system, wherein the identifier uniquely identifies the current network device in the network,
one of a geographic location at which the current network device is to be stationed or an identifier of a vehicle with which the current network device is to be stationed, and
a representation of an arrangement of the plurality of network devices with respect to one another;

installing the executable code and the configuration information on the current network device; and testing the current network device by controlling a satellite signal generator configurable to produce one or more radio frequency signals that simulate transmissions from satellites of a global navigation satellite system and by controlling one or more wireless communication interfaces operably coupled to the computer system to communicate directly with the current network device using radio frequency signals, wherein the one or more wireless communication interfaces are configurable by the computer system to operate using a wireless local area network communication protocol and to operate using a wireless vehicle to vehicle communication protocol, according to the configuration information.

18. The non-transitory computer-readable medium according to claim 17, wherein testing the current network device comprises controlling a cellular communication network signal generator configurable to transmit and receive radio frequency signals that simulate wireless communication of one or more cellular network base stations with the current network device.

19. The non-transitory computer-readable medium according to claim 17, wherein testing the current network device comprises:
collecting results for each test performed upon the current network device; and
forwarding the collected results to the cloud-based system in storage for the current network device.

20. The non-transitory computer-readable medium according to claim 17, wherein testing the current network device comprises:

causing a device operably coupled to the computer system to physically print on a medium, one or both of a human readable label and an electronically readable label, using the configuration information.

21. The non-transitory computer-readable medium according to claim 17, wherein the configuration information comprises one or more configuration parameters that control selection, by the current network device, of a communication methodology from a plurality of available communication methodologies for use by the current network device to communicate information to other network devices of the plurality of network devices.

22. The non-transitory computer-readable medium according to claim 21, wherein the plurality of communication methodologies comprises:
   a communication methodology that employs only a specific wireless communication protocol to communicate with a destination network device of the plurality of network devices,
   a communication methodology that employs any wireless communication protocol available on the current network device to communicate directly with the destination network device, and
   a communication methodology that communicates with the destination network device via any network device of the plurality of network devices that is within wireless communication range of the current network device.

23. The non-transitory computer-readable medium according to claim 17, wherein the software application directs the computer system to define at least one condition an occurrence of which causes identified software of the executable code to be updated on the current network device.

24. The non-transitory computer-readable medium according to claim 23, wherein the at least one condition comprises one or both of an occurrence of a particular operating condition in the current network device and/or a current date matching a particular date.

25. The system according to claim 1, wherein the one or more wireless communication interfaces are operable as a wireless station communicating with the current network device operating as a wireless access point and as a wireless access point communicating with the current network device operating as a wireless station, according to a wireless local area network protocol compliant with an IEEE 802.11 a, IEEE 802.11b, IEEE 802.11g, IEEE 802.11n, or IEEE 802.11ac standard, and are also operable to communicate with the current network device using a vehicle to vehicle protocol compliant with an IEEE 802.11p standard.

26. The method according to claim 9, wherein the one or more wireless communication interfaces are operable as a wireless station communicating with the current network device operating as a wireless access point and as a wireless access point communicating with the current network device operating as a wireless station, according to a wireless local area network protocol compliant with an IEEE 802.11 a, IEEE 802.11b, IEEE 802.11g, IEEE 802.11n, or IEEE 802.11ac standard, and are also operable to communicate with the current network device using a vehicle to vehicle protocol compliant with an IEEE 802.11p standard.

27. The non-transitory computer-readable medium according to claim 17, wherein the one or more wireless communication interfaces are operable as a wireless station communicating with the current network device operating as a wireless access point and as a wireless access point communicating with the current network device operating as a wireless station, according to a wireless local area network protocol compliant with an IEEE 802.11 a, IEEE 802.11b, IEEE 802.11g, IEEE 802.11n, or IEEE 802.11ac standard, and are also operable to communicate with the current network device using a vehicle to vehicle protocol compliant with an IEEE 802.11p standard.

* * * * *